(12) United States Patent
Cicerone et al.

(10) Patent No.: US 11,415,867 B1
(45) Date of Patent: Aug. 16, 2022

(54) APPARATUS FOR CAPTURING CONSISTENT IMAGES OF AN OBJECT

(71) Applicant: Arc Eye LLC, Tempe, AZ (US)

(72) Inventors: James Cicerone, Phoenix, AZ (US);
Christian Cicerone, Phoenix, AZ (US)

(73) Assignee: Arc Eye LLC, Tempe, AZ (US)

( * ) Notice: Subject to any disclaimer, the term of this patent is extended or adjusted under 35 U.S.C. 154(b) by 0 days.

(21) Appl. No.: 17/194,245

(22) Filed: Mar. 6, 2021

Related U.S. Application Data

(60) Provisional application No. 63/157,692, filed on Mar. 6, 2021, provisional application No. 63/007,106, filed on Apr. 8, 2020, provisional application No. 62/986,668, filed on Mar. 7, 2020.

(51) Int. Cl.
*G03B 17/56* (2021.01)
*H04N 5/232* (2006.01)
*F16M 11/10* (2006.01)

(52) U.S. Cl.
CPC .......... *G03B 17/561* (2013.01); *F16M 11/10* (2013.01); *H04N 5/23203* (2013.01); *H04N 5/23299* (2018.08)

(58) Field of Classification Search
CPC ....... H04N 7/18; H04N 5/23238; G06T 11/60
USPC .......................................... 348/37, 368, 373
See application file for complete search history.

(56) References Cited

U.S. PATENT DOCUMENTS

| | | | |
|---|---|---|---|
| 2012/0177350 A1* | 7/2012 | Jancourtz | F16M 11/08 396/5 |
| 2015/0085067 A1* | 3/2015 | Mueller | A61B 5/0064 348/37 |

\* cited by examiner

*Primary Examiner* — Xi Wang
(74) *Attorney, Agent, or Firm* — Christopher P. Maiorana, PC

(57) ABSTRACT

An apparatus having a housing, an arm, a motor, and a camera mount. The housing may be connected to a ceiling of a room. The arm may have (i) a pivot portion connected to the housing and (ii) a portion extending from the pivot portion in a first direction. The motor may be connected to the pivot portion of the arm to move the arm in response to a control signal. The camera mount may be connected to an end of the portion of the arm.

20 Claims, 19 Drawing Sheets

APPARATUS FOR CAPTURING CONSISTENT IMAGES OF AN OBJECT

This application relates to U.S. Provisional Application 62/986,668, filed Mar. 18, 2020. This application also relates to U.S. Provisional Application 63/007,106, filed Apr. 16, 2020. This application also relates to U.S. Provisional Application 63/157,692, filed Mar. 6, 2021. Each of the mentioned applications are hereby incorporated by reference in its entirety.

FIELD OF THE INVENTION

The invention relates to photography generally and, more particularly, to a method and/or apparatus for taking consistent images of an object.

BACKGROUND

Taking consistent photographs of items for sale is often difficult. Various factors, such as lighting, skill of the operator, orientation of the camera, object location, etc. tend to cause inconsistent results. Better results can be obtained with a more skilled photographer, often spending large amounts of time and money setting up a photo shoot environment. When purchasing expensive items, quality pictures are important. Particularly, with online purchasing quality pictures are important for both the seller (to present the item accurately) and the buyer (to have as much information as possible when making a purchase).

It would be desirable to implement an apparatus for taking consistent images of an object.

SUMMARY

The invention concerns an apparatus comprising a housing, an arm, a motor, and a camera mount. The housing may be connected to a ceiling of a room. The arm may have (i) a pivot portion connected to the housing and (ii) a portion extending from the pivot portion in a first direction. The motor may be connected to the pivot portion of the arm to move the arm in response to a control signal. The camera mount may be connected to an end of the portion of the arm.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing an apparatus for taking consistent images of an object that may (i) capture consistent images and/or other sensor data of an object, (ii) capture video of an object, (iii) be implemented in a small area, (iv) track a position of an object, (v) capture images along a pre-defined path, (vi) capture a cloud of points, (vii) capture images from multiple perspectives with respect to an object and/or (viii) be easy to operate.

Figure 1:
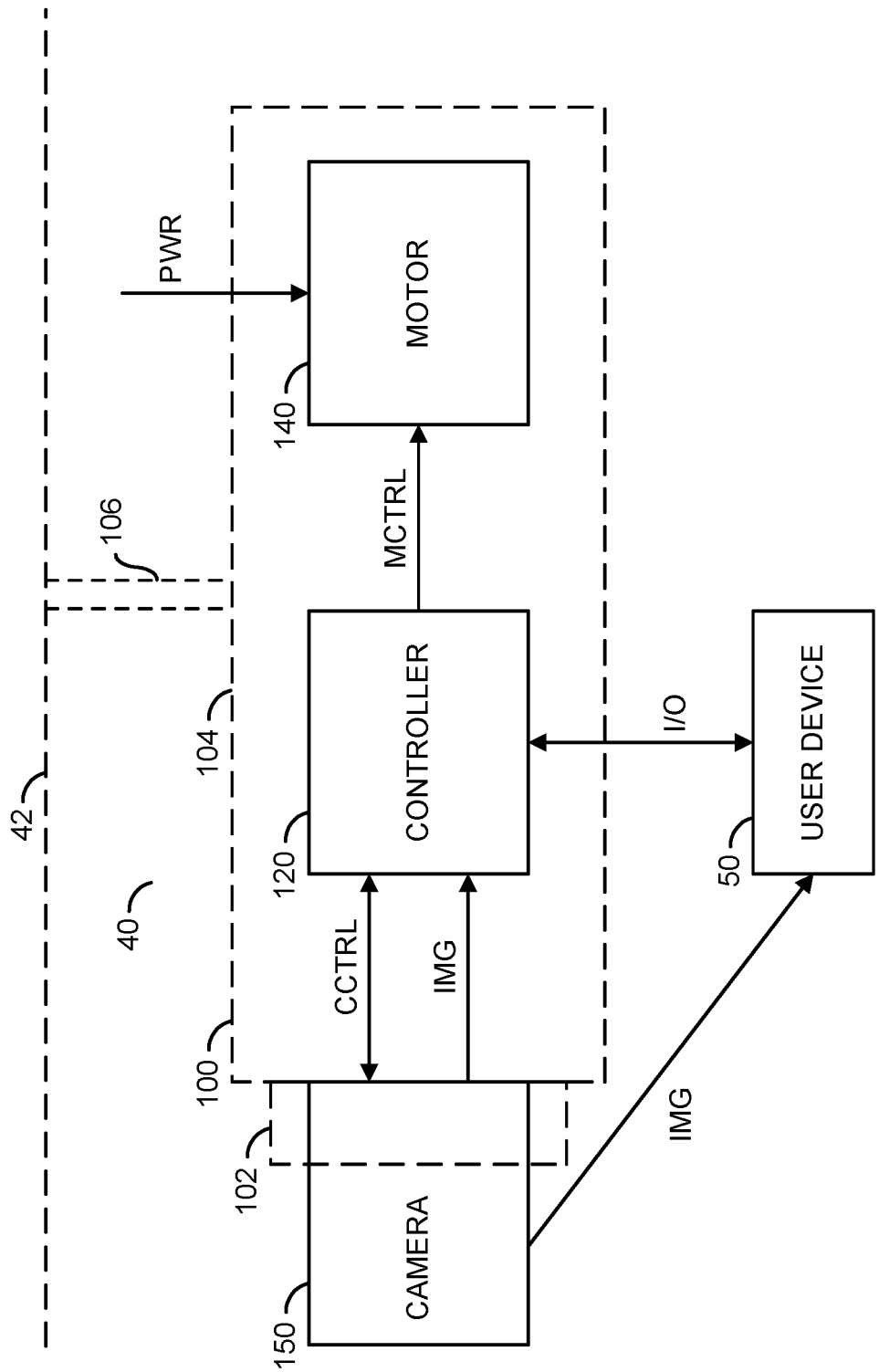
FIG. 1 is a block diagram illustrating an example embodiment of the present invention.

Referring to FIG. 1, a block diagram illustrating an example embodiment of the present invention. An apparatus 100 is shown. The apparatus 100 may be configured to capture consistent images of an object. The apparatus 100 is shown comprising a block 102. The block 102 may represent a bracket. The apparatus 100 may be implemented in a room 40. In an example, the apparatus 100 may be implemented comprising a housing 104 connected to a ceiling 42 of the room 40. A support 106 is shown connecting the housing 104 to the ceiling 42. Implementing the apparatus 100 connected to the ceiling 42 of the room 40 may enable the apparatus 100 to provide consistent images and/or video with respect to an object of interest (e.g., images and/or video that provide a consistent view of objects).

The apparatus 100 may comprise a block (or circuit) 120 and/or a block (or circuit) 140. The circuit 120 may implement a controller. The circuit 140 may implement a motor. The apparatus 100 may comprise other components (not shown). The number, type and/or arrangement of the components of the apparatus 100 may be varied according to the design criteria of a particular implementation.

The bracket 102 may be a mount configured to hold/support a camera (or capture device) 150. The camera 150 may be configured to capture images. A timing and/or settings of the capture of the images by the camera 150 may be controlled by the controller 120.

The controller 120 may be implemented, in an example, as a microcontroller, a video processor, a system on a chip (SoC), or other processor. The controller 120 may have an I/O control set to provide control features in addition to video processing. The controller 120 may present/receive a signal (e.g., CCTRL) to/from the camera 150. The control signal CCTRL may present a trigger signal to the camera 150. The control signal CCTRL may receive information from the camera 150 such as location information, orientation information, current status, etc. The controller 120 may present the control signal CCTRL to the camera 150 to adjust various features (e.g., a tilt, a zoom level, aperture settings, etc.).

The controller 120 may receive a signal (e.g., IMG). The signal IMG may be received from the camera 150. The signal IMG may comprise image data and/or video data. For example, the camera 150 may capture images of an object (e.g., in response to being triggered by the signal CCTRL) and communicate the captured images to the controller 120 via the signal IMG.

The controller 120 may also present a signal (e.g., MCTRL) to the motor 140. The signal MCTRL may control the movement of the motor 140. The motor 140 may be configured to move an arm in response to the signal MCTRL.

The motor 140 may receive a power signal (e.g., PWR). The signal PWR may provide power to the motor 140. The signal PWR may provide alternating current, or direct current, depending on the configuration of the motor 140. In an example, the signal PWR may be received from an external power source (e.g., a power outlet in the room). In another example, the signal PWR may be received from a battery (e.g., implemented in the housing of the apparatus 100). The signal PWR may be used by the apparatus 100 to supply power to other components of the apparatus 100 (e.g., the controller 120 and/or the camera 150). In some embodiments, the controller 120 may operate using a power supply separate from the motor 140. The supply of power to the motor 140 and/or other components of the apparatus 100 may be varied according to the design criteria of a particular implementation.

A user device 50 is shown. In one example, the user device 50 may implement a computing device (e.g., a desktop computer, a laptop computer, a netbook computer, a cloud computing service, etc.). In another example, the user device 50 may implement a mobile computing device (e.g., a smartphone, a tablet computing device, etc.). The type of user device 50 may be varied according to the design criteria of a particular implementation.

The user device 50 may be configured to communicate with the controller 120. A signal (e.g., I/O) is shown communicated between the controller 120 and the user device 50. In an example, the signal I/O may be implemented as a wireless signal. However, the signal I/O may be implemented as a wired signal (e.g., a direct connection, through a communications bus, or other wired configuration). In one implementation, the camera 150 may send the image signals IMG directly to the user device 50. In another example, the camera 150 may send the image signals IMG back to the controller 120 for processing and/or other analysis before being sent to the user device 50 (though the signal I/O). In another example, a user may retrieve the images from a removable media card on the camera 150. In yet another example, the camera 150 may be configured to wirelessly transmit the images to a computer connected to a network.

Figure 2:
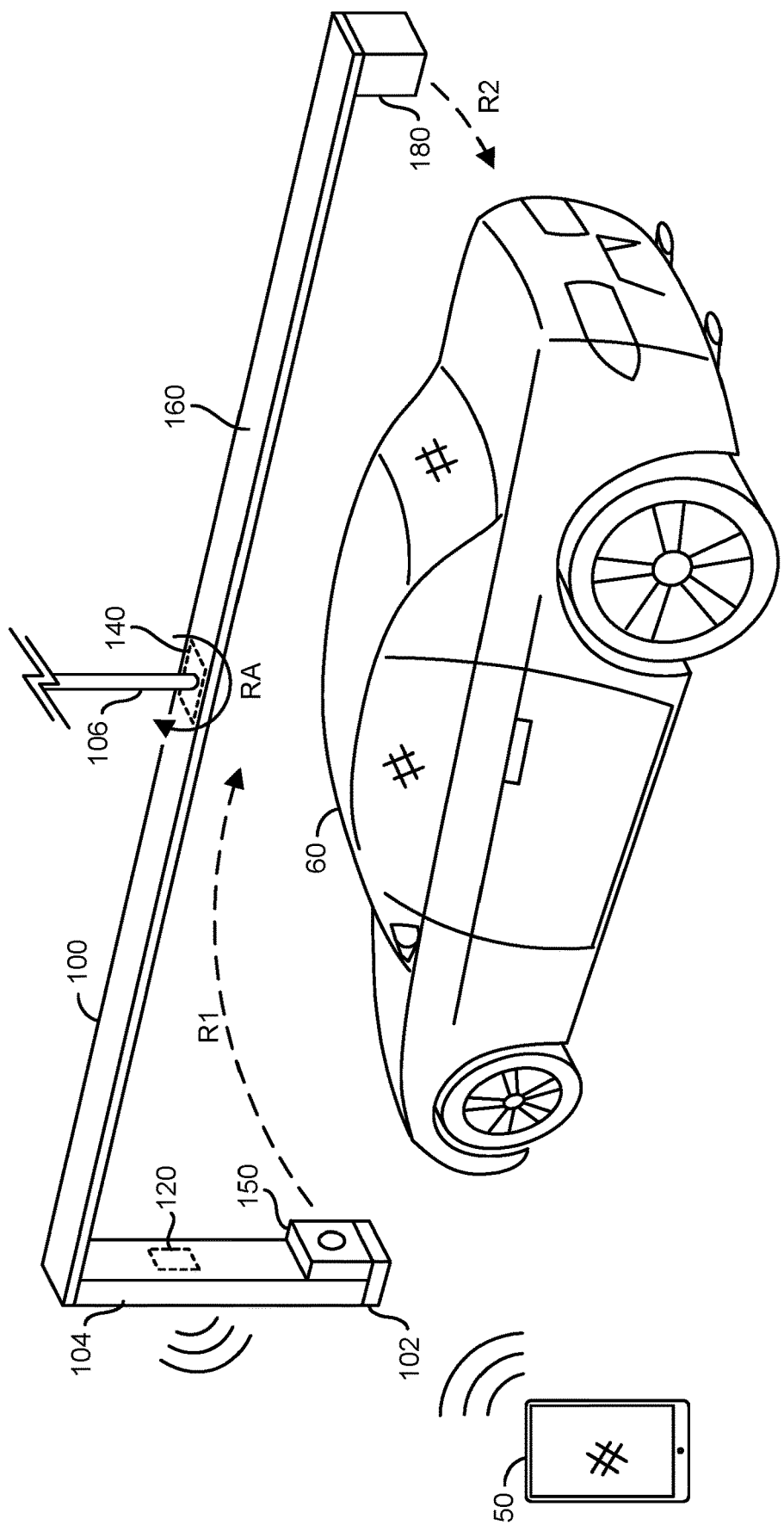
FIG. 2 is a diagram illustrating a perspective view of an apparatus capturing images of an object.

Referring to FIG. 2, a diagram illustrating a perspective view of the apparatus 100 capturing images of an object is shown. The apparatus 100 may be configured to capture images of an object 60. In the example shown, the object 60 may be a vehicle 60 being photographed. However, other objects (e.g., items to be offered for sale in an online auction), may also be photographed. While photographs have been discussed, a video of the object 60 may also be captured. The type of object 60 captured using the apparatus 100 may be varied according to the design criteria of a particular implementation.

The apparatus 100 may comprise an arm 160. The arm 160 may be connected to the support 106. The support may be secured to the ceiling 42 (not shown). The arm 160 may be extendable. The arm 160 may be configured to be rotated by the motor 140. The housing 104 is shown at one end of the arm 160. In the example shown, the motor 140 is shown implemented in the arm 160. In another example, the motor 140 may be connected externally to the arm 160.

The processor 120 is shown implemented as part the housing 104 connected to the arm 160 extending from the apparatus 100. The motor 140 is shown rotating the arm 100. The motor 140 may rotate the arm 160 in a direction (e.g., RA). In the example shown, the direction RA may be clockwise. In another example, the rotation direction RA may be counterclockwise. A counterweight 180 as shown on an end of the apparatus 100. The counterweight 180 may be on an end of the arm 160 opposite to the housing 104 (e.g., the processor 120 and the camera 150).

The rotation RA of the arm 160 may cause the camera 150 to rotate in a direction (e.g., R1) and the counterweight 180 to rotate in a direction (e.g., R2). The clockwise rotation of the arm 160 may cause the direction R1 and the direction R2 to be clockwise rotation. The camera 150 is shown taking pictures while facing the object 60 while traveling in the direction R1.

The user interface device 50 is shown wirelessly connecting to the microcontroller 120. The apparatus 100 generally spins around the vehicle 60 in response to the signal MCTRL. Photographs are generally taken at fixed intervals (to be described in more detail connection with FIG. 7). In an example, the apparatus 100 may stop at fixed intervals and/or after fixed movements to allow the camera 150 to capture an image. In another example, the apparatus 100 may continuously spin around the vehicle 60. In such an implementation, the camera 150 may have a shutter configured to operate fast enough to capture clear (e.g., sharp) images. In an example, the apparatus 100 may captures a series of images of the vehicle 60 without user intervention. In particular, a user would initiate a start of the capturing of images (e.g., a capture session to be described in association with FIG. 22), then the apparatus 100 would capture a series of images without further user intervention. In another example, the user may manually move the apparatus 100 and manually capture images from a wired or wireless control interface.

The apparatus 100 may comprise physical aspects (e.g., the bracket 102, the housing 104, the support 106, the arm 160, etc.) and electronic aspects (e.g., the controller 120, the motor 140, the camera 150, etc.). In some embodiments, the controller 120 may be implemented as a component of the arm 160. In some embodiments, the controller 120 may be implemented off the arm 160. For example, the controller 120 may be implemented in the housing 104 that may be a component distinct from the arm 160. Various features described may be combined together in various combinations.

In some embodiments, the apparatus 100 may comprise the arm 160 implemented as a static camera arm. The static embodiment of the arm 160 may comprise multiple mount points on the ceiling 42. With the static embodiment, the arm 160 may rotate in the direction RA around the subject 60 capturing images at regular intervals. In some embodiments, the static embodiment of the arm 160 may comprise a single mount point on the ceiling 42 and the arm 160 may rotate around the subject 60 in the direction RA capturing images at regular intervals.

In some embodiments, the apparatus 100 may comprise the arm 160 implemented as an extendable/retractable camera arm. The extendable/retractable embodiment of the arm 160 may be configured to extend/retract on the X/Y, horizontal axis. The extendable/retractable embodiment of the arm 160 may enable the controller 120 to adjust a distance from the camera 150 to a center point (e.g., a center point of where the object 60 is located) in real-time as the arm 160 rotates. In some embodiments of the extendable/retractable embodiment of the arm 160, the arm 160 may be configured to extend/retract the camera 150 on the X/Y and Z axes allowing the camera 150 to change height as well as distance from the center point. Details of the extendible/retractable embodiment of the arm 160 may be described in association with FIGS. 8-13.

The electronics portion of the apparatus 100 may provide operational characteristics. In an example, an operator of the apparatus 100 may pull the vehicle 60 (or places/moves the subject 60) to the center point of the apparatus 100 (e.g., underneath the housing 104). In one example, the operator may press a button (wired or wireless) to begin the capture routine. In another example, the capture routine (or session) may begin automatically based on scenario detection. For example, the routine may begin if the vehicle 60 stops near the center point for a long enough period of time. The arm 160 may spin around the subject while the controller 120 adjusts speed, distance, and rotation in real-time in order to meet the desired effects and/or image capture needs.

In some embodiments, the operator may open the doors of the vehicle 60 and run a capture routine. The camera 150 may move to pre-set positions and capture images. In some embodiments, the camera 150 may be moved by the arm 160 to desired goal positions. The microcontroller 120 may be configured to determine a best possible way to move the arm 160 to the desired goal position. In an example, if the operator uses the device 50 to input a goal position of 'driver side door', the controller 120 may be configured to move the arm 160 (based on an analysis of images captured by the camera 150, based on a preset orientation of a known object such as how the vehicle 60 will be parked, etc.) to a position that is perceived to be the 'driver side door'. In another example, the goal position may be a dashboard, a trunk, the wheels, etc. The types of goal positions recognized and/or the method that the controller 120 uses to recognize that the arm 160 is at the desired goal position may be varied according to the design criteria of a particular implementation.

Figure 3:
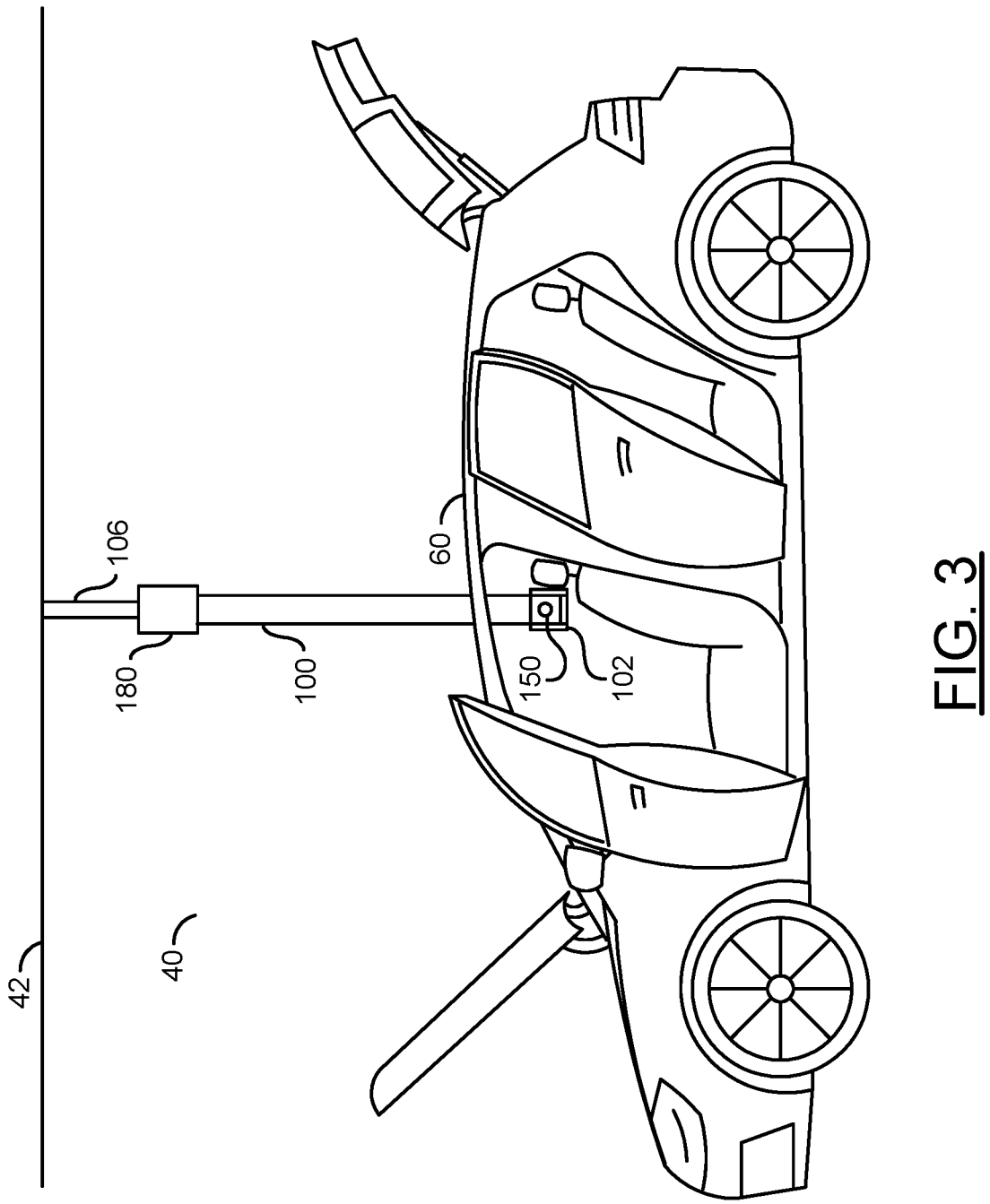
FIG. 3 is a diagram illustrating a side view of an apparatus capturing images of an object.

Referring to FIG. 3, a diagram illustrating a side view of an apparatus capturing images of an object is shown. The vehicle 60 may be driven into the room 40. The apparatus 100 is shown connected by the support 106 to the ceiling 42 of the room 40. The vehicle 60 may be positioned in the room 40 underneath the apparatus 100 (e.g., under the arm 160).

The camera 150 may be rotated in the direction R1 in response to the movement of the arm 160 (shown in association with FIG. 2). The bracket 102 is shown lowered to a level of the vehicle 60. The counterweight 180 and the camera 150 may rotate around the vehicle 60 to capture multiple perspectives of the vehicle 60.

The counterweight 180 may be configured to ensure a balance of the arm 160. In some embodiments, the counterweight 180 may be implemented as a wheel. The wheel implementation of the counterweight 180 may press against the housing 104. For the wheel implementation of the counterweight 180, the arm 160 may not extend/retract.

In the example shown, the doors, hood and trunk of the vehicle 60 are shown opened. In an example, a first capture session may be performed by the apparatus 100 with all the doors of the vehicle 60 closed (e.g., to capture all exterior details of the vehicle 60) and then a second capture session may be performed by the apparatus 100 with all the doors of the vehicle 60 opened (e.g., to capture details of the interior of the vehicle 60).

Figure 4:
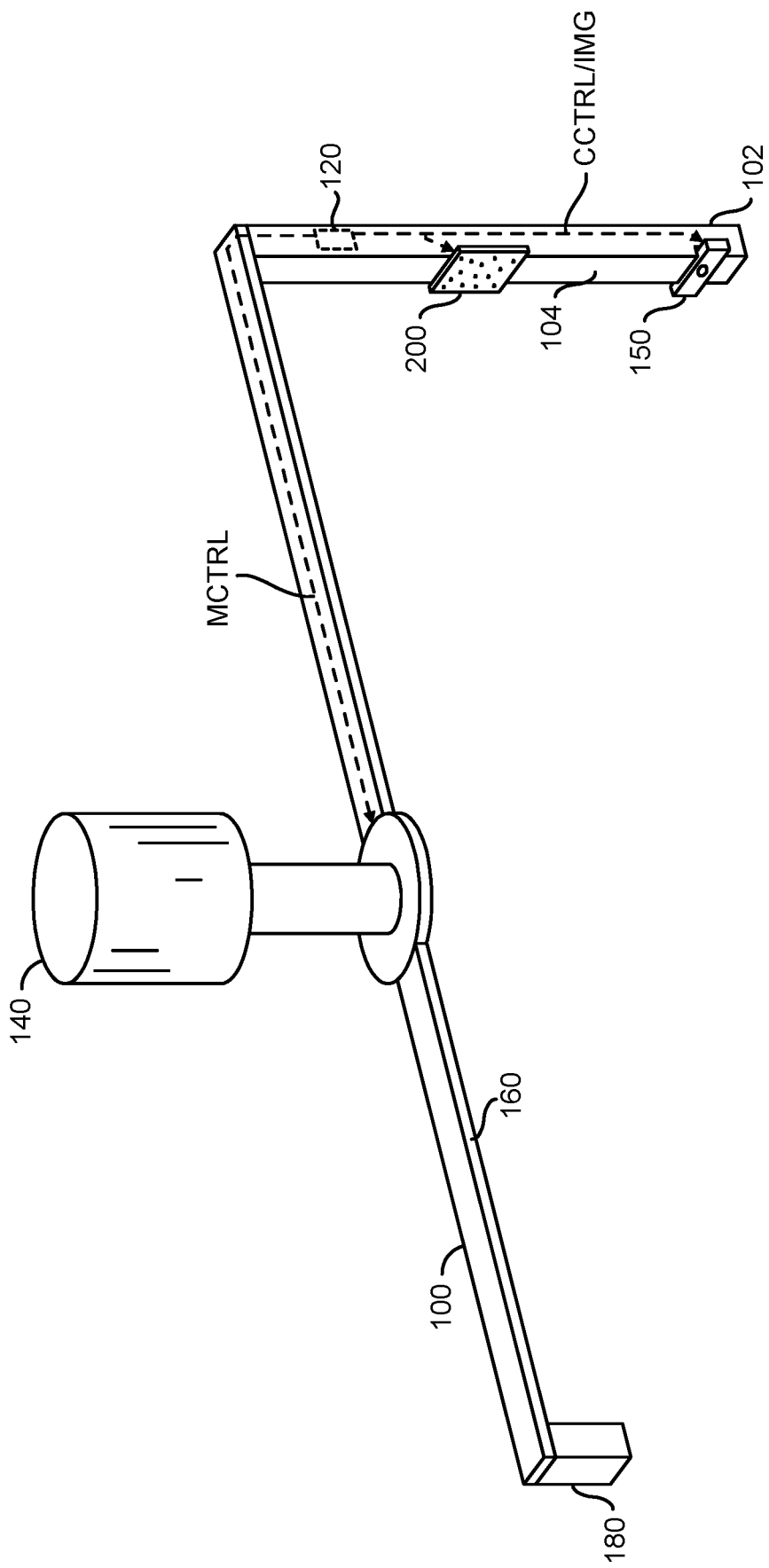
FIG. 4 is a diagram illustrating a perspective view of the apparatus.

Referring to FIG. 4, a diagram illustrating a perspective view of the apparatus 100 is shown. The arm 160 connected to the housing 104, the motor 140 and the counterweight 180 is shown. Wiring throughout the arm 160 and/or the housing 104 may enable the controller 120 to communicate to the motor 140 and/or the camera 150. In an example, the signal MCTRL is shown sent through the arm 160 to the motor 140 and the signal CCTRL/IMG is shown routed through the housing 104 between the camera 150 and the controller 120.

The microcontroller 120 may be used to control both the movements of the motor 140 and the triggering of the camera 150. In one example, the motor 140 may be implemented as a stepper motor that has one or two inputs to determine which direction the motor 140 turns. The motor 140 may move based on signals received on the inputs (e.g., the signal MCTRL). The motor 140 may be implemented as a stepper motor, a DC motor, an AC motor, a servo motor, etc. The motor 140 may drive a transmission or gearbox, which may be connected to the camera arm 160. The motor 140 may have one or more inputs to move the camera arm 160 based on signals generated by the controller 120. The motor 140 may have one or more outputs configured to communicate a position, a status and/or debugging information.

The microcontroller 120 may be implemented on a small device (e.g., a Raspberry Pi). Other microcontrollers may be implemented. A user interface may be implemented on the portable computing device 50 (e.g., a touch interface for a tablet computer). However, a fixed screen may also be implemented (e.g., a screen connected to the housing 104). The user generally pulls the car 60 into a position on a target below the arm 160, then initiates a start command. In one aspect, an automatic centering may be implemented.

In one example, the motor 140 may be implemented with a slip ring. The slip ring may allow the motor 140 to continue to spin in a particular direction without the need to untangle the power wires driving the motor 140. In another example, the motor 140 may be implemented with an energy whip, where cables are wrapped around the shaft and have limited travel. In an alternate implementation, software implemented on the controller 120 may be used to determine how many rotations in a particular direction have been made. A 360 degree turn of the arm 160 in one direction may be followed by a 360 turn in the opposite direction (e.g., to enable the apparatus 100 to be implemented without a slip ring, eliminating a wear item). In some embodiments, a multi-position selector switch may be implemented to determine how many rotations in a particular direction have been made. In some embodiments, a multi-turn encoder may be implemented. Other types of position tracking sensors may be implemented within the housing 104 and/or the arm 160.

The types of position tracking sensors and/or the wiring techniques in combination with various types of motors implemented may be varied according to the design criteria of a particular implementation.

A device 200 is shown. The device 200 may be mounted to the housing 104 and/or connected to the controller 120. In some embodiments, the device 200 may be an output device. For example, the device 200 may generate an output in response to a signal presented by the controller 120. In one example, the output device 200 may implement a flash to provide light for the camera 150. For example, the controller 120 may coordinate the flash generated by the output device 200 with the fixed intervals for image capture performed by the camera 150. In some embodiments, the device 200 may be an input device (e.g., a sensor). In one example, the sensor 200 may be configured to determine a location of the vehicle 60. For example, when the user drives the vehicle 60 under the apparatus 100, the sensor 200 may measure a location of the vehicle 60 to ensure that the vehicle 60 is in position for the capture session to properly capture clear images of the vehicle 60. The controller 120 may generate feedback about the position of the vehicle 60 in response to the measurements performed by the sensor 200. The camera 150 and/or the device 200 (e.g., a lidar, a sensor, etc.) may be installed together or separately on the arm 160 and used to position the camera arm 160, detect the position of the vehicle 60, avoid obstacles (e.g., prevent the arm 160 from colliding with another object in the rotational path), etc.

The controller 120 may be configured to organize image data captured from the camera 150 and/or sensor data captured by the device 200. The data organized by the controller 120 may be organized based on a direction of travel of the arm 160. In one example, when an energy whip is used, image data captured in the clockwise direction may be 1, 2, 3, 4, etc. In another example, when an energy whip is used, image data captured may be in a counterclockwise direction may be 4, 3, 2, 1. The controller 120 may be configured to name the data appropriately based on the direction of the arm 160 and/or generate metadata about the capture session for organization and processing captured data later.

In some embodiments, the housing 104 may be lowered and/or raised. In an example, the controller 120 may be configured to lower the housing 104 to drop the bracket 102 down to a lower height. In another example, the controller 120 may be configured to raise the housing 104 to raise the bracket 102 up to a higher height. Raising and lowering the bracket 102 may adjust the height of the camera 150. For example, the camera 150 may be lowered close to ground level (e.g., to capture images of wheels of the vehicle 60).

In the example shown, the housing 104 and/or the arm 160 are shown as solid for illustrative purposes. The solid frame of the arm 160 may be hollow. In some embodiments, the arm 160 may be implemented as a truss frame comprising gaps throughout the structure of the arm 160. The gaps of the truss frame structure of the arm 160 may reduce a weight of the apparatus 100 compared to a solid frame. The structure of the arm 160 may be configured to limit and/or reduce a weight of the apparatus 100. In one example, the material of various components of the apparatus 100 may be aluminum. In another example, the material of various components of the apparatus 100 may be carbon fiber. In yet another example, the material of various components of the apparatus 100 may be plastic. The structure and/or material of the various components of the apparatus 100 may be varied according to the design criteria of a particular implementation.

Figure 5:
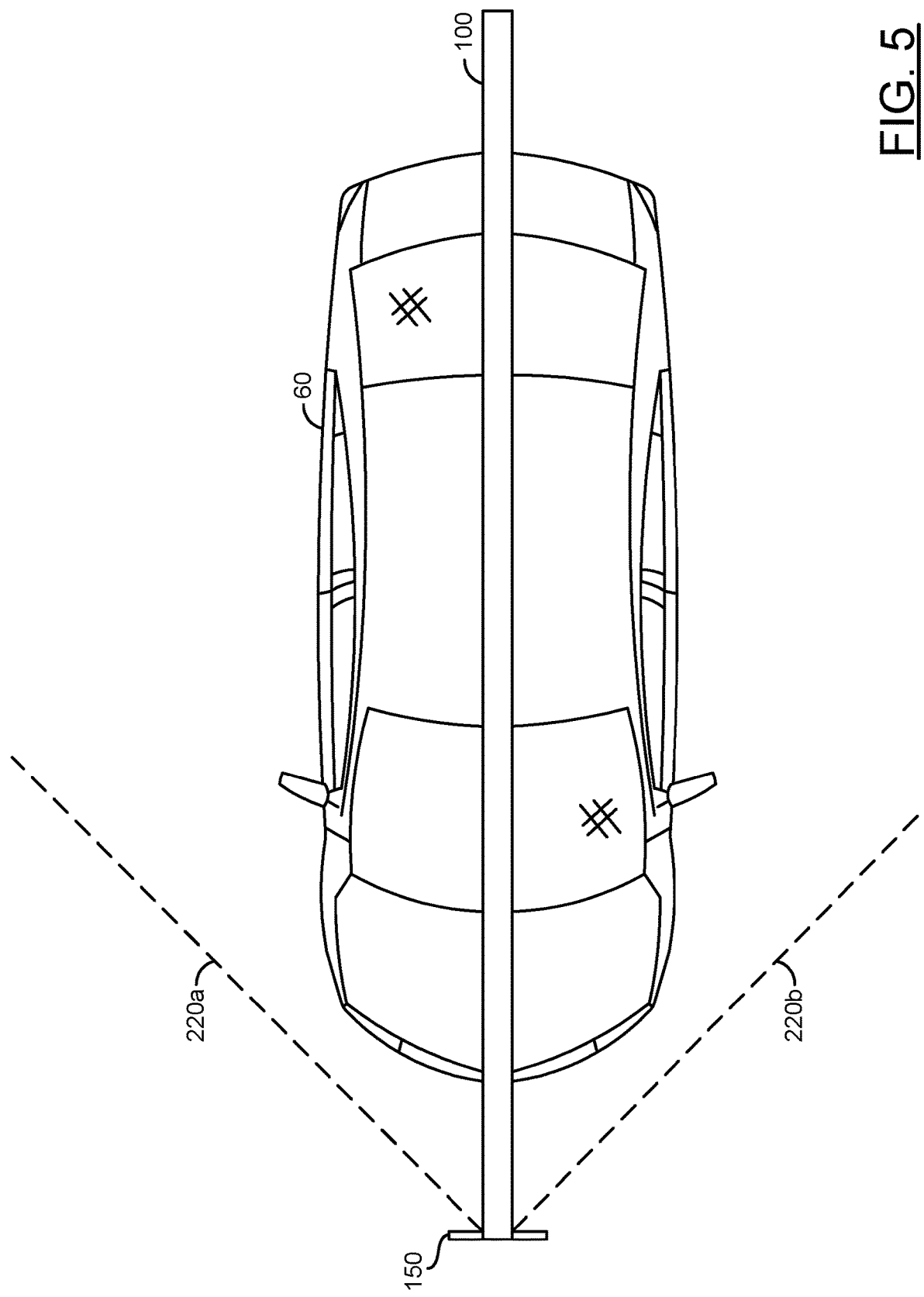
FIG. 5 is a diagram illustrating a top view of the apparatus capturing images of an object.

Referring to FIG. 5, a diagram illustrating a top view of the apparatus capturing images of an object is shown. The vehicle 60 is shown underneath the apparatus 100. The camera 150 is shown at a front end of the vehicle 60.

Dotted lines 220a-220b are shown. The dotted lines 220a-220b may represent a field of view of the camera 150. The images captured by the camera 150 may comprise the field of view 220a-220b. In the example shown, the field of view 220a-220b may capture a front end of the vehicle 60. As the arm 160 is rotated around the vehicle 60 during the capture session, the field of view 220a-220b may move, while being rotated to face the vehicle 60. The rotation and movement of the field of view 220a-220b may enable the images to comprise various perspectives of the vehicle 60. For example, if the arm 160 moves the camera 150 in a clockwise direction, the field of view 220a-220b may move from a front end of the vehicle 60 towards a passenger side of the vehicle 60.

The microcontroller 120 generally controls the triggering of the camera 150. In one example, the arm 160 may stop at a number of fixed positions for a moment to capture a picture of the object 60. The stops at the fixed positions may occur rapidly (e.g., potentially unnoticeable to the human eye). In another example, the arm 160 may slowly move around the object 60, and the pictures without the need to stop the arm 160. In an example, a shutter of a particular camera 150 implemented may be fast enough to get sharp images of the object 60 without the need for the arm 160 to stop. With such a continuous movement of the arm 160, a second pass of the arm 160 may be used to capture certain portions of the object 60 in more detail. For example, a first pass may generate 8, 10, 16, etc. individual images. A second pass may be used to generate close up images of certain portions of the object 60 (e.g., images of wheels, fender areas, the vehicle interior, or other areas of particular interest).

Figure 6:
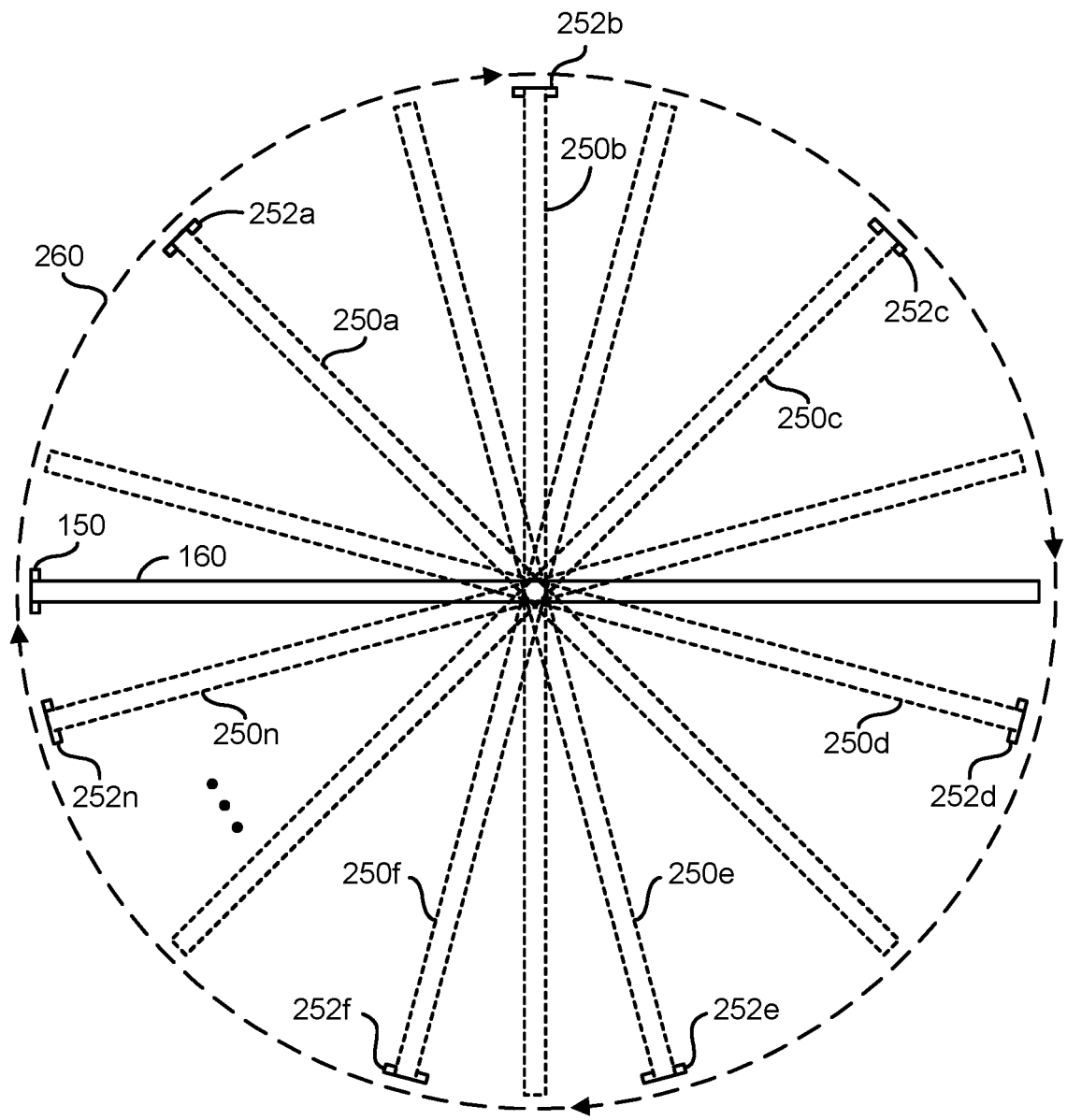
FIG. 6 is a diagram illustrating a top view of a rotation of an arm.

Referring to FIG. 6, a diagram illustrating a top view of a rotation of an arm is shown. The arm 160 is shown (e.g., horizontally) with the camera 150 at one end (e.g., a left side). The arm 160 with the camera 150 on the left side may represent a starting position of the arm 160. The arm 160 may rotate during the capture session.

A dotted circle 260 is shown. The dotted circle may represent the rotation of the arm 160 during the capture session. In the example shown, the arm 160 may rotate in the clockwise path 260. The clockwise path 260 may represent one rotation of the arm 160.

Interval locations 250a-250n are shown. The interval locations 250a-250n may represent positions of the arm 160 at various moments in time during the capture session. For example, the rotation 260 during the capture session may move the arm 160 from the starting position, to the interval location 250a, then to the interval location 250b (e.g., vertically oriented in the top-down view), then to the interval location 250c, etc. After the interval location 250n, the capture session may finish with the arm 160 returning to the horizontal orientation of the starting location.

Camera locations 252a-252n are shown. The camera locations 252a-252n may correspond with the interval locations 250a-250n of the arm 160. As the arm 160 moves to the interval locations 250a-250n, the camera 150 may move to the camera locations 252a-252n. The controller 120 may trigger the camera 150 at each of the camera locations 252a-252n in order to capture the images. The camera locations 252a-252n may rotate along the perimeter of the object 60 that may be located under the arm 160. The number of interval locations 250a-250n and/or camera locations 252a-252n where images are captured during the capture session may be varied according to the design criteria of a particular implementation.

In some embodiments, the images may be captured at rotational capture positions based on hardcoded degrees (e.g., 0, 30 degrees, 60 degrees, 90 degrees, etc.). In some embodiments, the images may be captured based on a number of images per total degrees traveled (e.g., 10 images per 360 degrees may be calculated by the controller 120 as one image every 36 degrees of rotation). In some embodiments, the images may be captured at irregular intervals and/or distances (e.g., 0, 10 degrees, 30 degrees, 90 degrees, etc.). In some embodiments, instead of capturing fixed images, at the interval locations 250a-250n, the camera 150 may be configured to capture continuous video of the vehicle 60 during the 360 degree spin of the path 260.

For each capture session, the arm 160 may be moved clockwise or counter-clockwise. In some capture sessions, the rotation of the arm 160 may comprise a combination of both counterclockwise and clockwise rotation. The controller 120 may be configured to switch between clockwise and counter-clockwise rotation of the arm 160 in real-time.

In the example shown, the path 260 may be a 360 rotation (e.g., a complete rotation). In some capture sessions, the arm 160 may not need to complete a full 360 degree spin. In some capture sessions, the arm 160 may perform multiple rotations.

Figure 7:
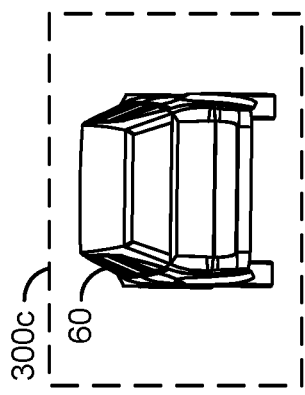
FIG. 7 is a diagram illustrating example output images.
Figure 7:
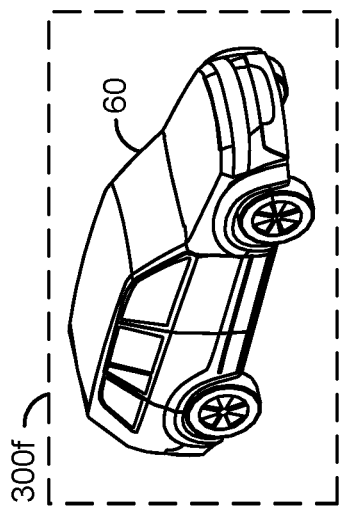
Figure 7:
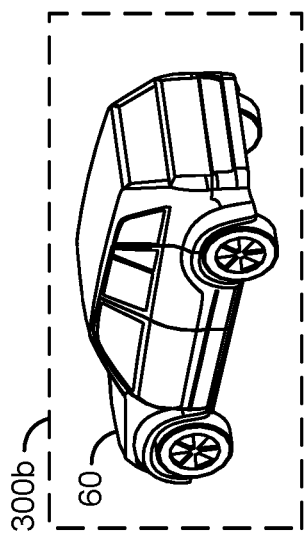
Figure 7:
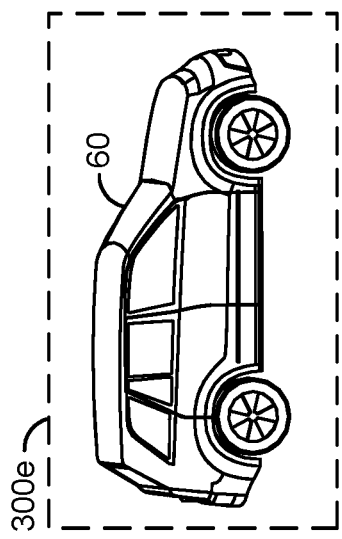
Figure 7:
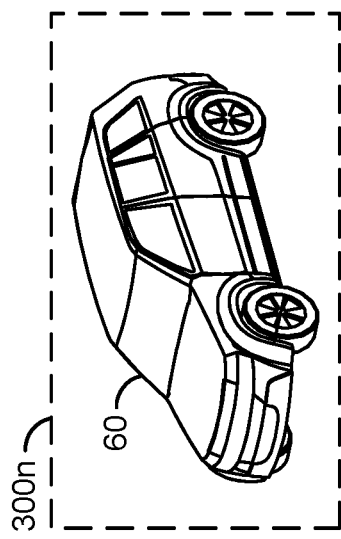
Figure 7:
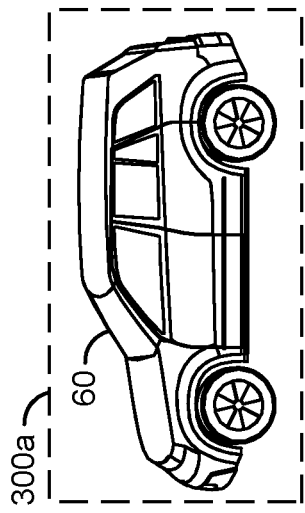
Figure 7:
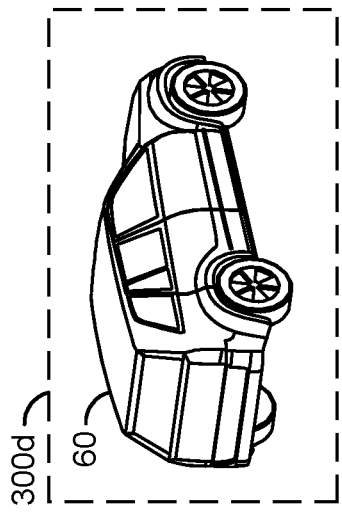
Figure 7:
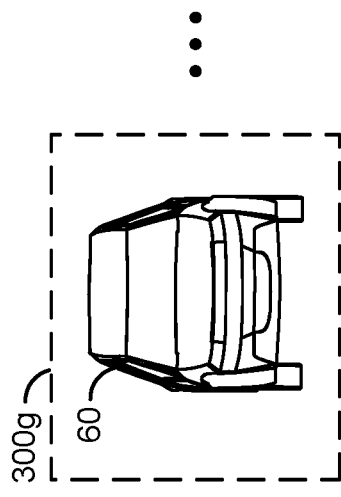

Referring to FIG. 7, a diagram illustrating example output images is shown. Various views of the vehicle 60 in a number of image (or video) frames 300a-300n are shown. In the example shown, eight pictures are captured. However, the particular number of pictures 300a-300n captured may be varied to meet design criteria of a particular implementation.

In an example, each of the pictures 300a-300n may correspond to one of the camera locations 252a-252n shown in the capture session described in association with FIG. 6. For example, the perspective shown of the vehicle 60 in each of the pictures 300a-300n may be different (e.g., the picture 300a may show a driver side of the vehicle 60, the picture 300c may show a rear view of the vehicle 60, the picture 300e may show a passenger side view of the vehicle 60, etc.). As the camera 150 moves to each of the camera locations 252a-252n, the corresponding pictures 300a-300n may be generated. After the camera 150 moves through each of the camera locations 252a-252n (e.g., a complete rotation of the arm 160), the pictures 300a-300n may comprise a full 360 degree view of the vehicle 60.

In one example, 16 pictures may be captured. In another example, 32 pictures may be captured. In yet another example, 100 pictures may be captured. Additional close-up pictures may be captured to show potential blemishes on the vehicle 60. In some embodiments, one camera may capture all of the pictures. In some embodiments, multiple cameras may be implemented, each configured to capture pictures. For example, a second camera may be configured to capture the close-up pictures. The number of pictures captured may be varied according to the design criteria of a particular implementation.

Figure 8:
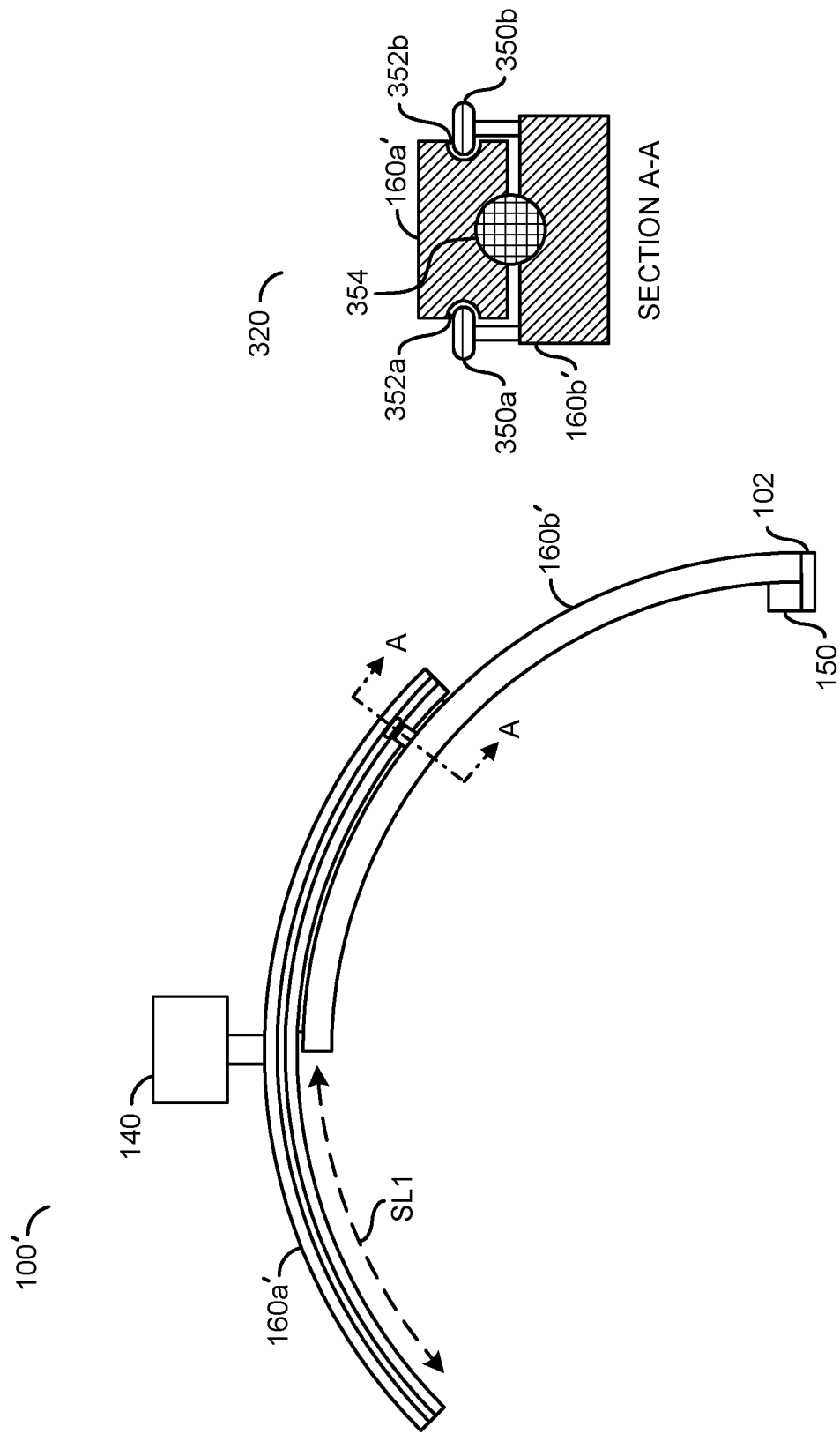
FIG. 8 is a diagram illustrating of an alternate embodiment of the apparatus.

Referring to FIG. 8, a diagram illustrating of an alternate embodiment of the apparatus is shown. An embodiment of the apparatus 100' is shown comprising the bracket 102, the motor 140, the camera 150 and the arm 160a'-160b'. The arm 160a'-160b' may be implemented as two separate components, an arc 160a' and an arc 160b'. The arc 160a' and the arc 160b' may enable the arm 160a'-160b' to bend down (e.g., down to a height that may be approximately level with the object 60) so that the camera 150 may capture the images all around the object 60.

The arc 160a' may be connected to the motor 140. The arc 160b' may implement a movable section. The arc 160b' may move along the arc 160a' in a direction SLI. In an example, the arc 160a' may remain stationary, while the arc 160b' moves with respect to the arc 160a' by sliding in the direction SLI. The arc 160b' may move with respect to the arc 160b' in the direction SLI, while the arc 160a' may not move in the direction SLI. The arc 160a' may be rotated by the motor 140, which may also cause the arc 160b' to be rotated.

In an example, from the perspective shown, moving along the direction SLI to the left may cause more of a portion of the arc 160b' to overlap with the arc 160a', which may result in the camera 150 being raised up. In another example, from the perspective shown, moving along the direction SLI to the right may cause less of the portion of the arc 160b' to overlap with the arc 160a', which may extend the camera 150 down lower. Such an implementation may allow the camera 150 to capture images of the vehicle 60 at various angles. In one example, extending or retracting the arc 160b' in the direction SLI may enable the camera 150 to capture close up images of particularly interesting wear-type items, such as wheels and/or tires. Wheels tend to get scuffed as a vehicle is used. A purchaser of a used vehicle may be particularly interested in the condition of the wheels. Close-up pictures of the tire may also be interesting to a potential customer.

A cross-section A-A is shown for the arc 160a'-160b'. A view 320 is shown illustrating the cross-section A-A. The arm 160a'-160b' may implement a bearing configuration to provide a smooth operation of the arm 160a'-160b'.

The cross-section A-A view 320 may show the arc 160a' above the arc 160b'. Rails 350a-350b are shown. The rails 350a-350b are shown extending up from the arc 160b'. The rails 350a-350b may be configured to fit together with grooves 352a-352b on the arc 160a'. A bearing 354 is shown between the arc 160a' and the arc 160b'. The bearing 354 may enable the arc 160b' to slide in the direction SLI with respect to the arc 160a' while the rails 350a-350b may ensure that the arc 160a' and the arc 160b' remain aligned. The rails 350a-350b and the grooves 352a-352b may ensure that when the motor 140 rotates the arc 160a', the force of the rotation may be transferred to the arc 160b' to enable the arm 160a'-160b' to rotate together. In an example, the bearing 354 may be implemented as a linear bearing.

Figure 9:
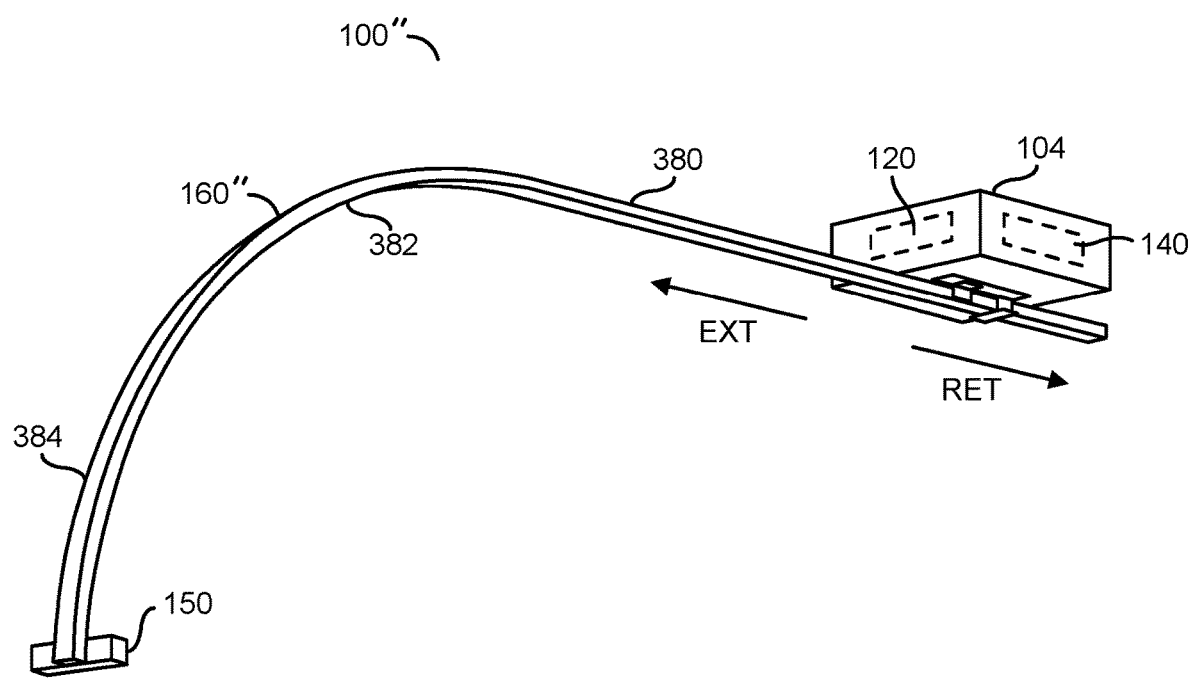
FIG. 9 is a diagram illustrating an alternate embodiment of the arm.

Referring to FIG. 9, a diagram illustrating an alternate embodiment of the arm is shown. An embodiment of the apparatus 100" is shown. The apparatus 100" is shown comprising the housing 104 connected to the arm 160". The housing 104 may comprise the controller 120 and/or the motor 140.

The arm 160" may comprise a top portion 380, a bend 382 and a hanging portion 384. The top portion 380 may be relatively straight. The top portion 380 may be connected to the housing 104. The bend 382 may curve the arm 160" downwards. The bend 382 may lead into the hanging portion 384. The hanging portion 384 may comprise the camera 150. The hanging portion 384 may be configured to extend the arm 160" down in front of the object 60. In some embodiments, the bend 382 may be approximately a 90 degree angle and the hanging portion 384 may hang down generally perpendicular to the top portion 380. In some embodiments, the bend 382 may be a curve that gradually extends the hanging portion 384 down to a height of the object 60. The camera 150 may be directed towards the object 60 by the hanging portion 384.

The top portion 380 may be moved along a direction EXT or a direction RET. The direction EXT and the direction RET may be a linear movement with respect to the housing 104. The direction EXT may generally implement an adjustment in an outward direction. The direction RET may generally implement an adjustment in an inward direction. Moving the top portion 380 outwards in the linear direction EXT (e.g., to the left in the example perspective shown), may cause the bend 382 and the hanging portion 384 to move farther away from the housing 104. Moving the top portion 380 inwards in the linear direction RET (e.g., to the right in the example perspective shown), may cause the bend 382 and the hanging portion 384 to move closer to the housing 104. In an example, when the object 60 is under the housing 104, extending the top portion 380 outwards may result in the camera 150 moving farther away from the object 60 and retracting the top portion 380 inwards may result in the camera 150 moving closer to the object 60.

The extension in the direction EXT or retraction in the direction RET of the top portion 380 may be controlled by a signal from the microcontroller 120. In one example, the amount of extension of the top portion 380 may be pre-configured before a capture session is initiated (e.g., the amount of extension of the top portion 380 may be the same throughout the capture session). In another example, the amount of extension of the top portion 380 may be adjustable throughout the capture session (e.g., the camera 150 may be moved farther away from and closer to the object 60 as the arm 160" is rotated). By moving the arm 160" in and out from a center target point, an oval path may be created when the arm 160" is rotated.

Figure 10:
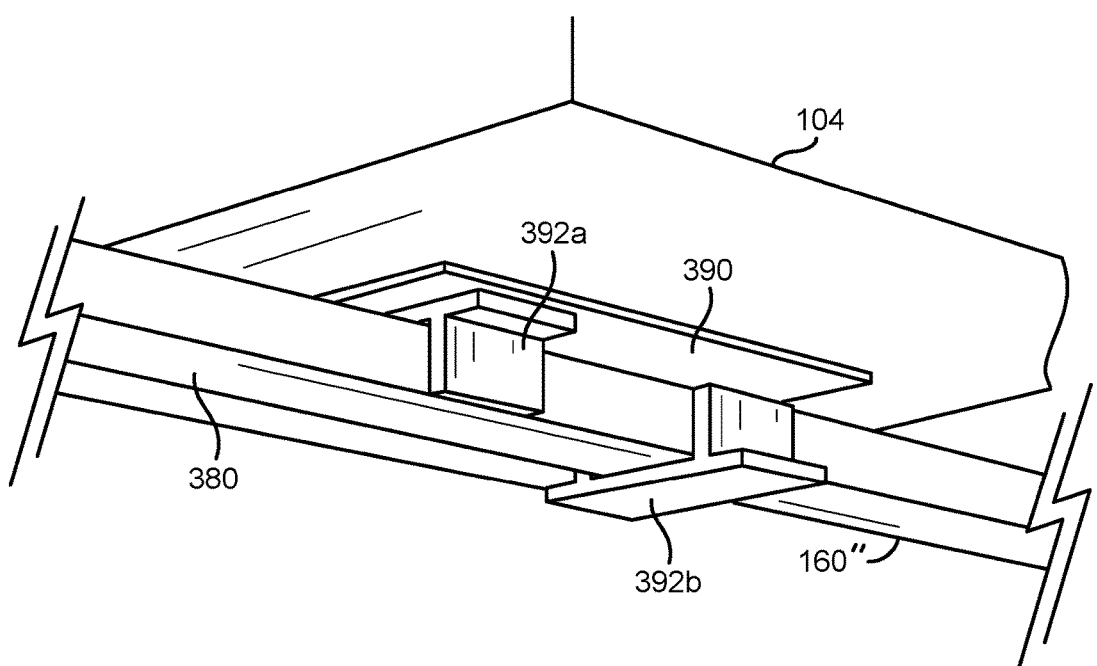
FIG. 10 is a diagram illustrating a detailed view of the arm.

Referring to FIG. 10, a diagram illustrating a detailed view of the arm is shown. The housing 104 and the top portion 380 of the arm 160" is shown. A pivot support 390 is shown attached to the housing 104. The pivot support 390 may be rotated by the motor 140 to cause the arm 160" to rotate during the capture session.

Brackets 392a-392b are shown. The brackets 392a-392b may connect the pivot support 390 to the arm 160". When the pivot support 390 is rotated by the motor 140, then the brackets 392a-392b may cause the arm 160" to rotate. The brackets 392a-392b may be configured to enable the top portion 380 to slide in the direction EXT or the direction RET to enable the arm 160" to extend or retract. For example, the brackets 392a-392b may be configured to adjust a width of the arm 160".

Figure 11:
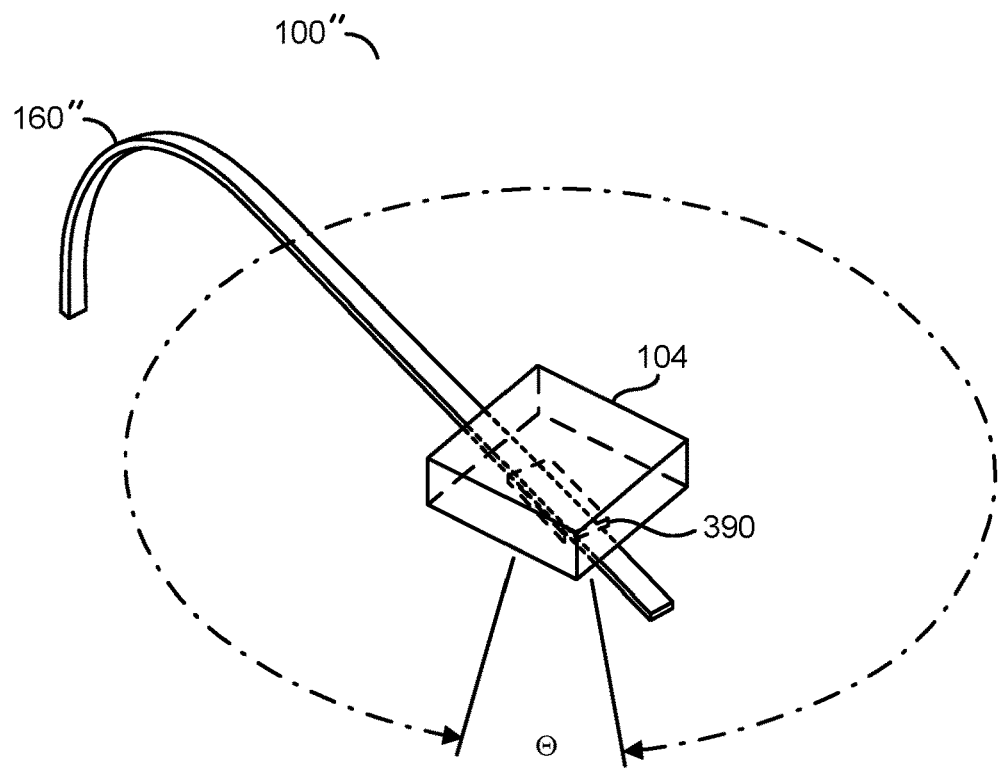
FIG. 11 is a diagram illustrating movement of the arm around a target point.

Referring to FIG. 11, is a diagram illustrating movement of the arm around a target point is shown. The apparatus 100" is shown. The arm 160" is shown extending from the housing 104. The pivot support 390 is shown attached to the housing 104 and the arm 160".

The pivot support 390 may enable the arm 160" to rotate about a target point. The pivot support 390 may be the target point of rotation. An angle Θ is shown. The angle Θ may represent amount of rotation of the arm 160" about the target point. The rotation of the arm 160" may be clockwise or counterclockwise. The amount of rotation in either direction may be varied based on the details of the capture session. The amount of rotation may be controlled by the controller 120.

Figure 12:
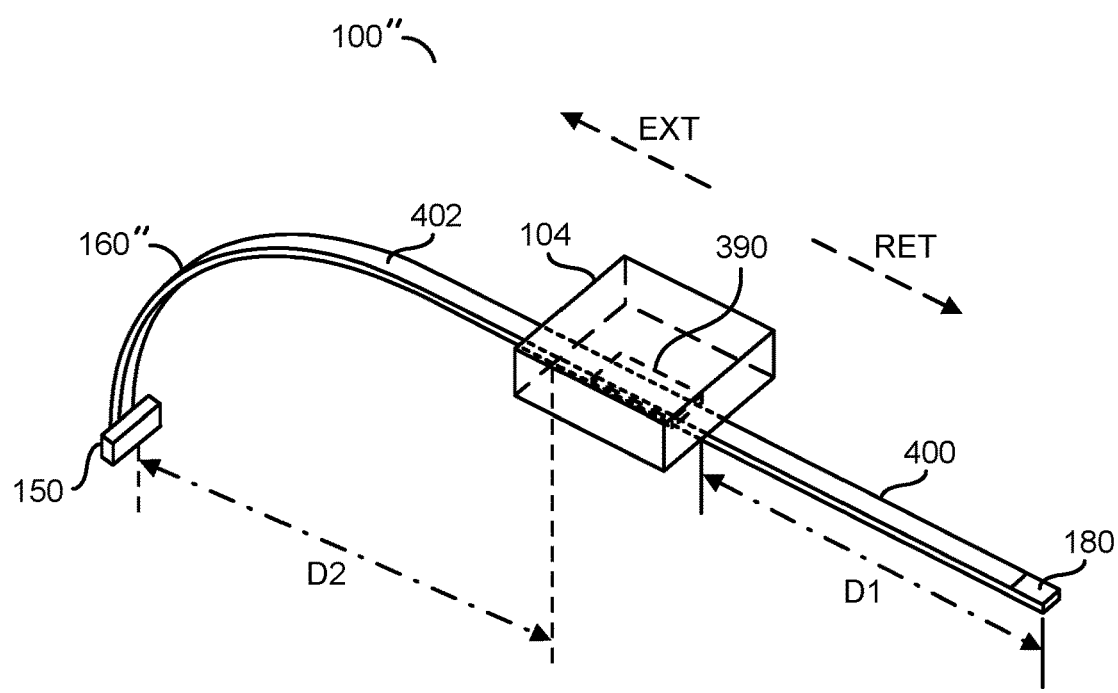
FIG. 12 is a diagram illustrating movement of the arm around in an inward/outward direction about a pivot.

Referring to FIG. 12, a diagram illustrating movement of the arm around in an inward/outward direction about a pivot is shown. The arm 160" and the housing 104 of the apparatus 100" are shown. The camera 150 and the counterbalance 180 are shown attached to the arm 160". The pivot support 390 is shown connecting the arm 160" to the housing 104. The pivot support 390 may enable the arm 160" to move inward/outward (e.g., linearly) as the arm 160" rotates about a center point.

The arm 160" may be configured to slide through the pivot point 390. A retracted portion 400 and an extended portion 402 of the arm 160" is shown. The extended portion 402 of the arm 160" may comprise the portion of the arm 160" between the housing 104 and the camera 150. In the perspective shown, the extended portion 402 may be a section of the arm 160" that is to the left side of the pivot support 390. The retracted portion 400 may the portion of the arm 160" between the housing 104 and the counterbalance 180. In the perspective shown, the retracted portion 400 may be a section of the arm 160" that is to the right side of the pivot support 390.

A length D1 is shown. The length D1 may represent the length of the retracted portion 400 (e.g., a distance from the housing 104 to the counterbalance 180). A length D2 is shown. The length D2 may represent a length of the extended portion 402 (e.g., a distance from the housing 104 to the camera 150). The length D1 and the length D2 may be changed an equivalent amount as the motor 140 moves the arm 160" (e.g., the total length of the arm 160" may be constant). In one example, moving the arm 160" in the direction EXT may increase the distance D2 as the camera 150 is moved further from the housing 104 and the distance D1 may decrease a corresponding amount. In another example, moving the arm 160" in the direction RET may increase the distance D1 as the camera 150 is moved closer to the housing 104 and the distance D1 may increase a corresponding amount.

Figure 13:
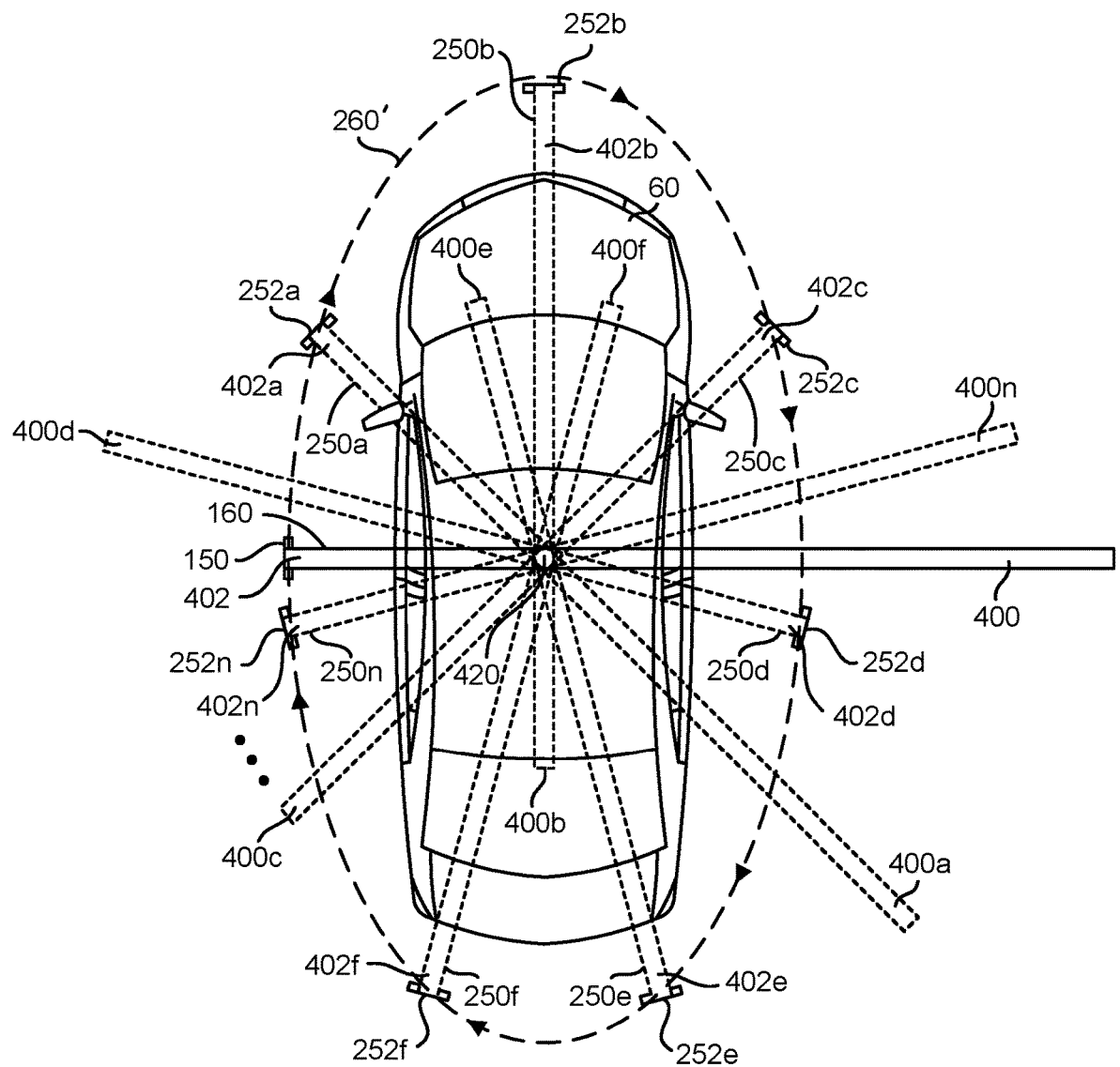
FIG. 13 is a diagram illustrating capturing of images with the arm rotating in an oval path.

Referring to FIG. 13, a diagram illustrating capturing of images with the arm rotating in an oval path is shown. The arm 160 is shown (e.g., horizontally) with the camera 150 at the extended end 402. The arm 160 with the camera 150 on the left side may represent a starting position of the arm 160. The arm 160 may rotate during the capture session. A center point 420 is shown. The center point 420 may be a location of the pivot support 390 (shown in association with FIG. 12). The retracted end 400 of the arm 160" is shown on the opposite side of the center point 420 from the extended end 402.

The dotted shape 260' is shown. The dotted shape 260' may be an oval shape. The oval shape 260' may represent the rotation of the arm 160" during the capture session. In the example shown, the arm 160" may rotate in the clockwise direction in the oval shape 260'.

The interval locations 250a-250n are shown. Similar to the interval locations 250a-250n shown in association with FIG. 6, the interval locations 250a-250n may represent positions of the arm 160 at various moments in time during the capture session. The camera locations 252a-252n are shown. The camera locations 252a-252n may correspond with the interval locations 250a-250n of the arm 160" for the oval path 260'. The controller 120 may trigger the camera 150 at each of the camera locations 252a-252n during the capture session.

To enable the oval path 260', the controller 120 may cause the motor 140 to rotate the arm 160" and retract/extend the arm 160" while rotating. The vehicle 60 is shown within the oval path 260'. The vehicle 60 is shown having a larger length than width. At the starting location of the camera 150, the camera 150 may capture an image of the driver side of the vehicle 60 (e.g., the arm 160" may be extended over the width of the vehicle 60). The extended end 402 may be shorter than the retracted end 400 to enable the camera 150 to be close to the driver side of the vehicle 60.

During the capture session, the arm 160" may rotate to the interval location 250a. At the interval location 250a, the camera 150a may still be on the driver side of the vehicle 60 and the extended end 402a may still be shorter than the retracted end 400a. The next interval location 250b shown may be with the camera location 252b at a front end of the vehicle 60 (e.g., the arm 160" may be extended across the length of the vehicle 60). Since the vehicle 60 is longer than wide, the controller 120 may trigger the motor 140 to extend the arm 160". At the interval location 250b, the extended end 402b may be longer than the retracted end 400b.

The arm 160" may continue along the oval path 260' to the interval locations 250c-250d. At the interval locations 250c-250d, the camera locations 252c-252d may be on a passenger side of the vehicle 60. The controller 120 may cause the arm 160" to retract again and the extended ends 402c-402d may be shorter than the retracted ends 400c-400d. Continuing along the oval path 260', the interval locations 250e-250f may have the camera locations 252e-252f at the rear of the vehicle 60. As the arm 160" moves from the interval locations 250c-250d to the interval locations 250e-250f, the controller 120 may extend the arm 160". At the interval locations 250e-250f, the extended ends 402e-402f may be longer than the retracted ends 400e-400f. The arm 160" may move to the interval location 250n and towards the starting location on the passenger side and the controller 120 may retract the arm 160".

While the oval path 260' is shown, other irregular paths may be implemented. For example, when capturing images of certain objects, such as furniture, a motorcycle, a guitar, a boat, a piano, etc., a non-oval path may be implemented. The arm 160" may be retracted and extended during rotation to enable the various irregular paths. The type of path implemented for each capture session may be varied according to the design criteria of a particular implementation.

Figure 14:
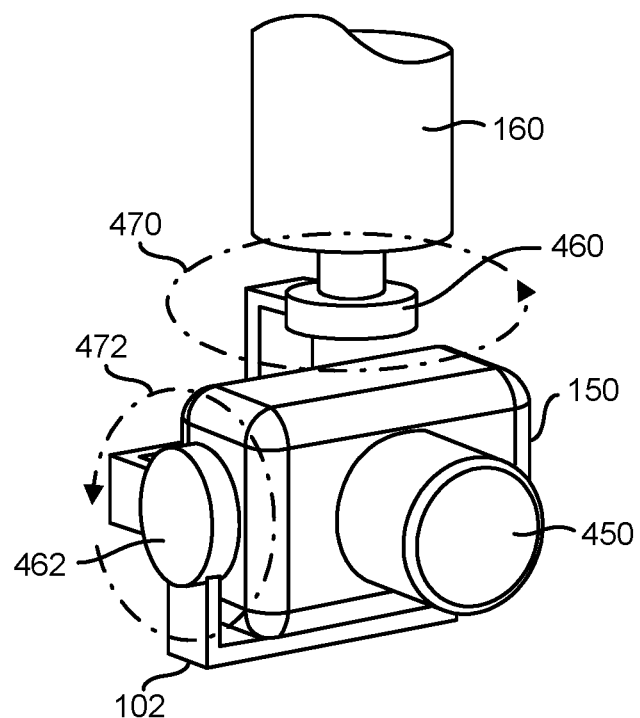
FIG. 14 is a diagram illustrating a front view of a camera mount.

Referring to FIG. 14, a diagram illustrating a front view of a camera mount is shown. The bracket 102 is shown connected below the arm 160. The camera 150 is shown held by the bracket 102. A lens 450 of the camera 150 is shown. The lens 450 may be directed towards the object 60 (not shown). The field of view 220a-220b (shown in association with FIG. 5) may extend from the lens 450. The perspective view shown may generally comprise a front and side view of the camera 150.

Figure 15:
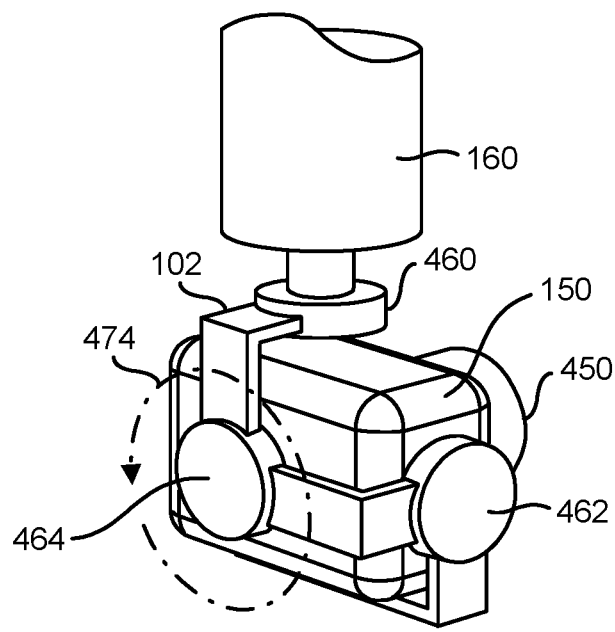
FIG. 15 is a diagram illustrating a rear view of a camera mount.

The bracket 102 may comprise a camera motor 460, a camera motor 462 and/or a camera motor 464 (to be described in association with FIG. 15). In one example, the camera motors 460-464 may implement servo motors. The camera motors 460-464 may be configured to pan, rotate and/or tilt the bracket 102. Panning, rotating and/or tilting the bracket 102 may adjust the direction of the lens 450 (and the field of view 220a-220b) of the camera 150.

A dotted arrow 470 and a dotted arrow 472 are shown. The dotted arrow 470 may illustrate a rotation of the camera motor 460. The dotted arrow 472 may illustrate a rotation of the camera motor 462. The rotations 470-472 are shown in a counterclockwise direction in the example shown. However, the camera motors 460-462 may be configured to rotate in the clockwise direction. The rotation 470 caused by the camera motor 460 may provide a panning movement for the camera 150 (e.g., turn lens 450 to the left or right). The rotation 472 caused by the camera motor 462 may provide a tilting movement for the camera 150 (e.g., turn the lens 450 up or down).

Referring to FIG. 15, a diagram illustrating a rear view of a camera mount is shown. A rear view of the bracket 102, the camera 150 and the arm 160 is shown. The perspective view shown may generally comprise a rear and side view of the camera 150.

The camera motor 462 and the camera motor 464 are shown. The camera motor 464 may be located behind the camera 150. A dotted arrow 474 is shown. The dotted arrow 474 may illustrate a rotation generated by the camera motor 464. The rotation 474 is shown in a counterclockwise direction in the example shown. However, the camera motor 464 may be configured to rotate in the clockwise direction. The rotation 474 caused by the camera motor 464 may provide a rotating movement for the camera 150 (e.g., rotate the body of the camera 150, while keeping the lens 450 pointed in the same direction).

Figure 16:
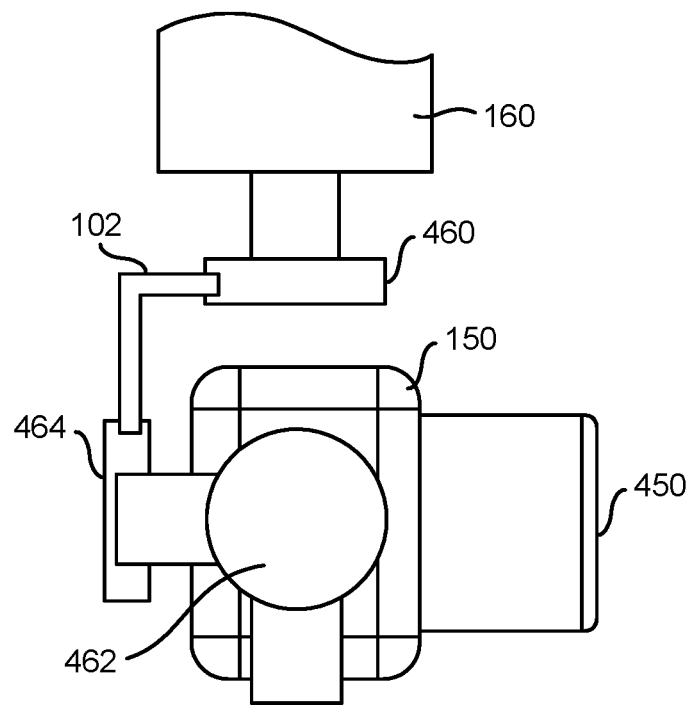
FIG. 16 is a diagram illustrating a side view of a camera mount.

Referring to FIG. 16, a diagram illustrating a side view of a camera mount is shown. A side view of the bracket 102, the camera 150 and the arm 160 is shown. The camera motor 460 is shown above the camera 150. The camera motor 462 is shown on one side of the camera 150. The camera motor 464 is shown behind the camera 150. The combination of the movement of the camera motors 460-464 may enable a combination of a pan, a tilt and/or a rotational movement of the camera 150.

Figure 17:
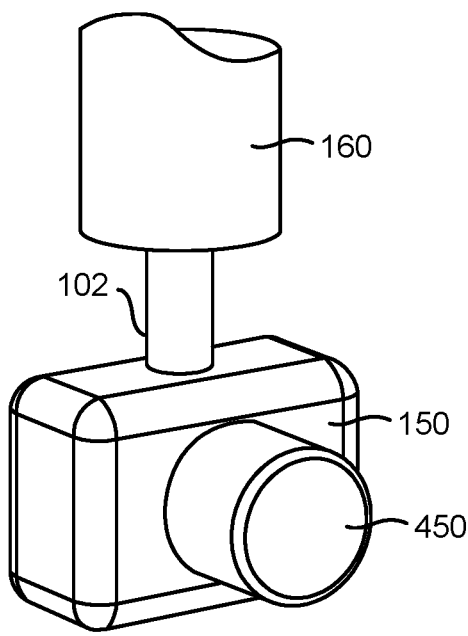
FIG. 17 is a diagram illustrating an alternate camera mount.

Referring to FIG. 17, a diagram illustrating an alternate camera mount is shown. The arm 160 is shown. The bracket 102 is shown extending below the arm 160. In the example shown, the bracket 102 may attach to a top of the camera 150. In another example, the bracket 102 may attach to a bottom of the camera 150 (e.g., the camera 150 may be in an upside down orientation on the bracket 102). The bracket 102 may be rotated by motors implemented within the arm 160 (not shown) to turn the camera 150.

The camera mount 102 may twist as the arm 160 moves inward/outward and/or the arm 160 rotates about the center point 420. The camera mount 102 may be controlled by a servo configured to cause the camera mount 102 to rotate (or twist) about a vertical axis. The camera mount 102 may implement a platform to hold the camera 150. The platform may hold the camera 150 pointing in a generally horizontal direction while the entire platform twists along the vertical axis. The extension of the arm 160 may be implemented with or without the twist of the camera mount 102.

The arm 160 may be implemented to be extendable/retractable in three dimensions. The camera 150 may be connected to the bracket 102 that may comprise a three axis gimbal. The combination of the arm 160 and the three axis gimbal may effectively grant the camera 150 six degrees of freedom. The multiple degrees of freedom to move may enable the camera 150 to move close to the subject 60 and change a rotational orientation to capture images without a need for implementing a post-processing de-warp.

Figure 18:
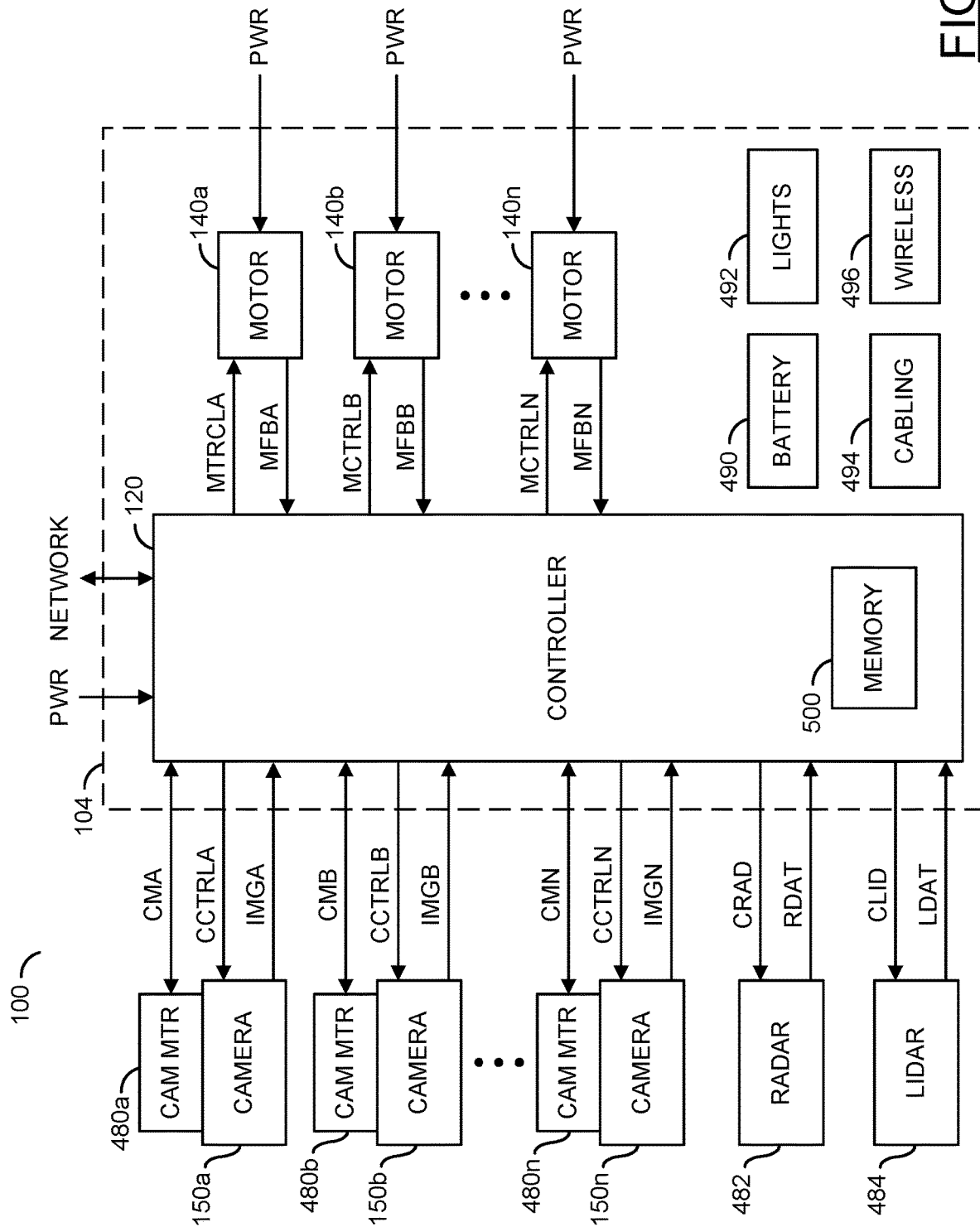
FIG. 18 is a block diagram illustrating an example embodiment implementing multiple cameras.

Referring to FIG. 18, a block diagram illustrating an example embodiment implementing multiple cameras is shown. An alternate block diagram of the apparatus 100 is shown. The housing 104 is shown. The apparatus 100 may comprise multiple cameras 150a-150n outside of the housing 104. The apparatus 100 may comprise the controller 120 and multiple motors 140a-140n within the housing 104. In some embodiments, one or more of the motors 140a-140n may be implemented external to the housing 104.

Blocks (or circuits) 480a-480n, a block (or circuit) 482 and/or a block (or circuit) 484 are shown outside of the housing 104. The circuits 480a-480n may implement camera motors. The circuit 482 may implement a radar. The circuit 484 may implement a lidar. The circuits 482-484 may be examples of the device 200 shown in association with FIG. 4. Other types of sensors may be implemented.

A block (or circuit) 490, a block (or circuit) 492, a block (or circuit) 494 and/or a block (or circuit) 496 are shown within the housing 104. A block (or circuit) 500 is shown as a component of the controller 120. The circuit 490 may implement a battery. The circuit 492 may implement lights. The circuit 494 may implement cabling. The circuit 496 may implement a wireless communication device. The circuit 500 may implement a memory. The apparatus 100 may comprise other components (not shown). The number, type and/or arrangement of the components of the apparatus 100 may be varied according to the design criteria of a particular implementation.

The camera motors 480a-480n may each be configured to move a respective one of the cameras 150a-150n. Each of the cameras 150a-150n may have a similar implementation as the camera 150. Each of the cameras 150a-150n may receive a respective one of the signals CCTRLA-CCTRLN and send a respective one of the signals IMGA-IMGN. The signals CCTRLA-CCTRLN may communicate similar data as the signal CTRL shown in association with FIG. 1. The signals IMGA-IMGN may communicate similar data as the signal IMG shown in association with FIG. 1.

In some embodiments, the cameras 150a-150n may be mounted to a single arm 160. In some embodiments, one or more of the cameras 150a-150n may be mounted to multiple arms (e.g., arms 160a-160n) implemented by the apparatus 100. Implementing multiple arms 160a-160n may allow for increased capture speed and/or increased data capture for use in photogrammetry and other applications. In an example, 2, 3, or 4 camera arms may be implemented. In some embodiments, photogrammetry may be implemented using only the camera 150 (e.g., single camera photogrammetry) on the arm 160. For single camera photogrammetry, the controller 120 may be configured to process images captured using photogrammetry to generate point clouds and/or 3D geometry and textures of the object 60.

In an example, the camera motors 480a-480n may comprise one or more of the camera motors 460-464 described in association with FIGS. 14-16. The camera motors 480a-480n are each shown communicating a respective signal (e.g., CMA-CMN). The signals CMA-CMN may comprise movement instructions generated by the controller 120. The cameras 150a-150n may be instructed to move utilizing a multi-axis control to particular positions defined by the capture session. The multi-axis control system may enable the cameras 150a-150n to be moved to multiple angles in relation to a specific point on the vehicle 60. The multiple angles may enable the captured images to reveal/detect/focus on specific parts/aspects/defects of the subject 60. In some embodiments, the camera motors 480a-480n may communicate feedback via the signal CMA-CMN. The feedback from the camera motors 480a-480n may provide the controller 120 information about a current orientation of each of the camera motors 480a-480n.

The camera motors 480a-480n may be configured to adjust the angle of the camera 150 and/or the sensor angle. Each of the cameras 150a-150n may have one or multiple motors (e.g., pan/tilt/zoom) or just (tilt). In some embodiments, multiple of the cameras 150a-150n may be attached to a single one of the camera motors 480a-480n (e.g., three cameras attached to the same pan motor). The combinations of the camera motors 480a-480n may be varied according to the design criteria of a particular implementation.

The radar 482 may be configured to receive a signal (e.g., CRAD). The signal CRAD may be generated by the controller 120 to trigger the radar 482. The radar 482 may be configured to generate a signal (e.g., RDAT). The signal RDAT may be the sensor data generated by the radar 482. The radar 482 may be configured to detect a position of the object 60.

The lidar 484 may be configured to receive a signal (e.g., CLID). The signal CLID may be generated by the controller 120 to trigger the lidar 484. The lidar 484 may be configured to generate a signal (e.g., LDAT). The signal LDAT may be the sensor data generated by the lidar 484. The lidar 484 may be configured to detect a position of the object 60.

The radar 482 and/or the lidar 484 may be mounted on the arm 160 and/or elsewhere in a building (e.g., the room 40) that analyzes the location of the vehicle 60 in 3D space. The controller 120 may utilize both the video camera 150 and the lidar sensor 484 together with sensor fusion. Other sensors such as a depth camera sensor, the radar sensor 482 and/or a structured light sensor may be mounted on the camera arm 160 or elsewhere in the room 40 to gather data that the controller 120 may aggregate using sensor fusion. In an example, the sensor fusion data may determine the position of the vehicle 60 in 2D or 3D space. The sensor fusion implemented by the controller 120 may enable the controller 120 to make inferences based on multiple disparate data sources that would not be capable of being made from any one of the data sources alone.

In some embodiments, the lidar 484 may be used to generate a cloud of points. A point cloud may be a set of data points in space. The points may represent a 3D shape of the object 60. Each point may comprise a set of X, Y and Z coordinates. The point clouds may be used for 3D scanning and/or by photogrammetry software, to measure many points on the external surfaces of the object 60. For example, the point cloud captured by the controller 120 may be used to create 3D CAD models for manufactured parts, for metrology and quality inspection, visualization, animation, rendering, etc. The controller 120 may be configured to convert the point cloud to a 3D surface.

Each of the motors 140a-140n and/or the controller 120 may receive the signal PWR. The controller 120 may send/receive a signal (e.g., NETWORK). The signal NETWORK may enable the controller 120 to communicate with external devices such as the user device 50, the internet and/or a local network.

Each of the motors 140a-140n may have a similar implementation as the motor 140 described in association with FIG. 1. Each of the motors 140a-140n may receive a respective signal (e.g., MTRCLA-MTRCLN) and send a respective signal (e.g., MFBA-MFBN). Each of the signals MTRCLA-MTRCLN may have a similar implementation as the signal MCTRL described in association with FIG. 1. The signals MFBA-MFBN may provide feedback about the position and/or RPM of the motors 140a-140n to the controller 120.

One or more of the motors 140a-140n may be configured to locomote the arm 160. In embodiments of the apparatus 100 with multiple implementations of the arm 160, the motors 140a-140n may each be configured to locomote the multiple arms. In some embodiments, other sensors such as the lidar 484 may be attached to one of the motors 140a-140n. One or more of the motors 140a-140n may rotate the arm 160. One or more of the motors 140a-140n may extend/retract the arm 160.

In some embodiments, the apparatus 100 may comprise the battery 490. The battery 490 may implement a hot-swappable battery. The battery 490 may provide an alternate power supply to the signal PWR.

The lights 492 may implement lighting indicators. The lights 492 may be pointed toward the object 60 or away from the object 60. In some embodiments, the lights 492 may be mounted to the arm 160. In some embodiments, the lights 492 may be implemented as part of the housing 104.

The apparatus 100 may comprise the cabling 494 for power and/or data. The cabling 494 may be routed throughout the housing 104 and/or through the arm 160. In some embodiments, the cabling may be replaced with a wireless data and control system.

The wireless module 496 may enable the wireless data and/or control system. In some embodiments, the camera 150 may be connected directly to a network (e.g., for a security camera embodiment). In some embodiments, the camera 150 may be connected to the computer/processor 120 that controls the settings and/or downloads/transmits the images via the signal NETWORK using the wireless module 496.

The memory 500 may be configured to store data and/or computer readable instructions (e.g., instructions executable by the controller 120). The data stored by the memory 500 may comprise the images, the video, the point of cloud information, metadata about the images/video, etc. The computer readable instructions may comprise various routines for the capture sessions (e.g., the rate of image capture during the capture session, the path for the arm 160, the timing of the extension/retraction of the arm 160, the movement of the camera motors 480a-480n, etc.).

The computer/processor 120 may be configured to analyze the data captured in real-time and/or modify the movement instructions for the arm 160 in real-time (e.g., using data from the camera 150 to determine the best path to a point in 3 dimensional space). In some embodiments, the data captured and stored by the memory 500 may comprise images and/or video. In some embodiments, the data captured and stored by the memory 500 may comprise data from sensors such the lidar 484, the radar 482, a depth camera, a structured light scanner, etc. The data from the sensors and/or the images/video from the camera 150 may be used by the controller 120 to modify the movement of the arm 160 and/or trigger events in real-time or to produce 3D geometry in addition to image data.

The computer/processor 120 may be configured to process the metadata about the images captured before transmitting the images. In an example, the metadata may comprise color information, the size of the images, camera settings (e.g., aperture, F-stop number, etc.). The computer/processor 120 may be configured to record all data about the routine (e.g., the capture session). The data about the capture session may comprise processing duration, system health, camera metadata, hardware states, etc. The data about the capture session may be used for analysis of the images and/or training the controller 120 to learn for future capture sessions (e.g., how to locate particular goal positions with respect to various classes of objects).

The computer/processor 120 may be configured to de-warp the captured images. De-warping may enable the images generated to have the appearance that the photo was captured from a different vantage point. The controller 120 may be configured to crop high resolution images into multiple images later (e.g., images may be cropped to a close up on a wheel of the vehicle 60 and/or a close up on a door of the vehicle 60, etc.).

The images captured may be adjusted by the controller 120 based on imperfections detected in the vehicle 60. Such an adjustment may be implemented with or without deep learning. The controller 120 may trigger the cameras 150a-150n to capture multiple images in quick succession for every capture position. For example, at a capture position of 10 degrees, images may be captured at 8, 9, 10, 11, and 12 degrees. The controller 120 may analyze the differences between each image (e.g., potentially after performing de-warping), isolate the arm 160 and fill regions with various interpolation techniques such as nearest neighbor to completely eliminate the camera 150 reflection on the surface of the vehicle 60.

The apparatus 100 may operate in an idle state (e.g., when not performing a capture session). An indicator (e.g., a display, a projector, one of the lights 492, a laser display projector, a speaker, etc.) may be used to signal the operator when the object 60 is centered (e.g., below the housing 104, appropriately positioned under the arm 160, appropriately positioned at a target location, etc.). The location of the object 60 may be detected by real-time analysis of camera images, by the lidar sensor 484, by the radar sensor 482, by structured light sensors, by stereo depth cameras and/or other types of depth cameras. There may be the video camera 150 and/or the lidar sensor 484 mounted on the arm 160 or elsewhere in the room 40. The data captured may be processed by the controller 120 in real-time to determine the position of the vehicle 60 within the capture volume. The data about the object 60 may be analyzed and used to determine details about the vehicle 60 (e.g., size, height, type, color, etc.). The data analyzed by the controller 120 may be used to adjust the capture routine parameters before the routine begins.

When the object 60 is detected, a display or lighted indicator may signal to the operator when the object 60 is centered in the capture volume. In some embodiments, the controller 120 may be configured to detect when the object 60 comes to a stop in the center of the capture volume and then may automatically begin a predetermined capture routine. In some embodiments, the controller 120 may wait for the operator to begin the capture routine manually (e.g., by wired, wireless, or remotely accessible web-based interface). In some embodiments, before initiating the capture routine, the controller 120 may determine the timing of the cameras 150a-150n. In one example, the controller 120 may implement a timer that divides the time of full rotation by a predetermined number of photos. In another example, the controller 120 may be configured to capture images at predetermined positions through use of a position sensor such as an encoder. In yet another example, the controller 120 may be configured to capture images based on dynamically determined positions for objects based on type (class), size or shape detected through the use of image analysis, or other sensors such as the lidar 484, the radar 482, structured light, depth cameras, etc.

When the capture routine begins, the arm 160 may rotate around the object 60 and capture images. The arm 160 may stop when the apparatus 100 has finished the routine. After stopping the routine, the arm 160 may move to (or find) the "home" position (e.g., the idle position) using an encoder or mounted sensor (switch). The arm 160 may move to another position relative to the start position or end position or a predetermined position that is not the "home" (or zero) position. The sensor may be configured to ensure that the apparatus 100 does not lose track of the "zero" position.

The controller 120 may use the position of the arm 160 (e.g., based on the feedback signals MFBA-MFBN) or a time to communicate with other devices as the arm 160 rotates through the capture session. For example, the lights 492 may be adjusted in real-time as the arm 160 rotates. In some embodiments, the position of the arm 160 may be communicated with displays and/or projectors that display images on surfaces that surround the arm 160 in real-time as the arm 160 rotates.

As the images are captured, the controller 120 may enable the images to be downloaded to another device (e.g., a computer, the user device 50, etc.). In some embodiments, the images may be downloaded to a computer or the controller 120 after the arm 160 has finished the capture session. In some embodiments, the images may be downloaded to a computer or the controller 120 while the capture session is underway (e.g., while the arm 160 is still rotating). The images may be transferred over a network (wired or wireless) to a computer or server or microcontroller.

When the capture routine has finished, the apparatus 100 may enable various options at the end of a routine. In one example, the operator may use an interface (e.g., the user device 50) to delete all captured data and start again. In another example, the operator may start another capture routine. In yet another example, the operator may end the capture routine and submit the images to a central server. After the capture routine(s) are finished, the apparatus 100 may return to the idle state (e.g., ready for another vehicle).

In some embodiments, the controller 120 may be configured to automatically submit the images to a central server at the end of a routine and return to an idle state, ready for another vehicle. In some embodiments, the captured image data and/or systems logs may remain stored locally by the memory 500. In some embodiments, a display interface may display the images to operator so the operator may approve before submitting.

The various operator interfaces and/or indicators could take various forms. In one example, the interface may comprise a lighted indicator on the arm 160 or elsewhere in the room 40. In another example, the interface may comprise a display with or without touchscreen controls. In yet another example, the interface may comprise a wired or wireless keypad/buttons. In still another example, the interface may comprise a tablet/phone/or remote display device that connects to software running on the controller 120 (e.g., allows for configuration or operation). In another example, the interface may comprise vehicle position sensors.

The capture routines may be general and/or specific to particular types (classes) of the object 60. In an example, for a vehicle, the capture routine may be configured to capture close up images of a vehicle wheel. The controller 120 may be configured to analyze the captured images and use wheel recognition (e.g., computer vision) to identify whether a wheel is factory or stock. The make and model of the car 60 may be deciphered from reading a vehicle identification number (e.g., VIN) when the doors are open. The object recognition may provide metadata about whether OEM wheels versus aftermarket wheels are installed.

In some embodiments, the controller 120 may be configured to perform object recognition on the exterior of the vehicle 60. The data used as reference for the object detection may be stored by the memory 500 and/or received via the signal NETWORK. In one example, the object detection may be configured to scan for scratches and/or dents. When a scratch/dent is detected, the capture session may be updated to take a zoomed in picture of the imperfection (e.g., useful for people interested in the quality of a vehicle). In one example, the controller 120 and/or the memory 500 may use a convolutional neural network to train for the recognition of imperfections. Fleet learning may be implemented based on performing capture routines on multiple different types of vehicles. The fleet learning may enable training to determine problem areas of certain vehicles (e.g., a particular make/model/year of a vehicle may develop rust spots at particular locations, and the locations of the rust spots may be learned over time by analyzing multiple different vehicles).

In some embodiments, the capture routine may be configured to allow the camera 150 to move into the inside of the vehicle 60 to get a clear view for interior shots. The capture routine may define a standard number of pictures that would be performed on each vehicle (e.g., to provide consistency in the marketplace). The location of the arm 160 may be determined based on running particular movements on a timer (e.g., no encoder or sensors), running particular movements based on encoder data (e.g., angle), running particular movements based on sensor data (e.g., lidar or image sensor data) and/or a combination of technologies.

In some embodiments, the arm 160 may be mounted on the floor, in the rotational movement or rotational movement and z-axis (height) movement configurations. A ramp may be designed with a "slot" all the way around so that the vehicle 60 may easily drive over while still allowing the camera 150 to move around the vehicle with 360 degrees of freedom. For example, there may be a "track" for the rotating arm 160 with a long span to support the vehicle weight.

Figure 19:
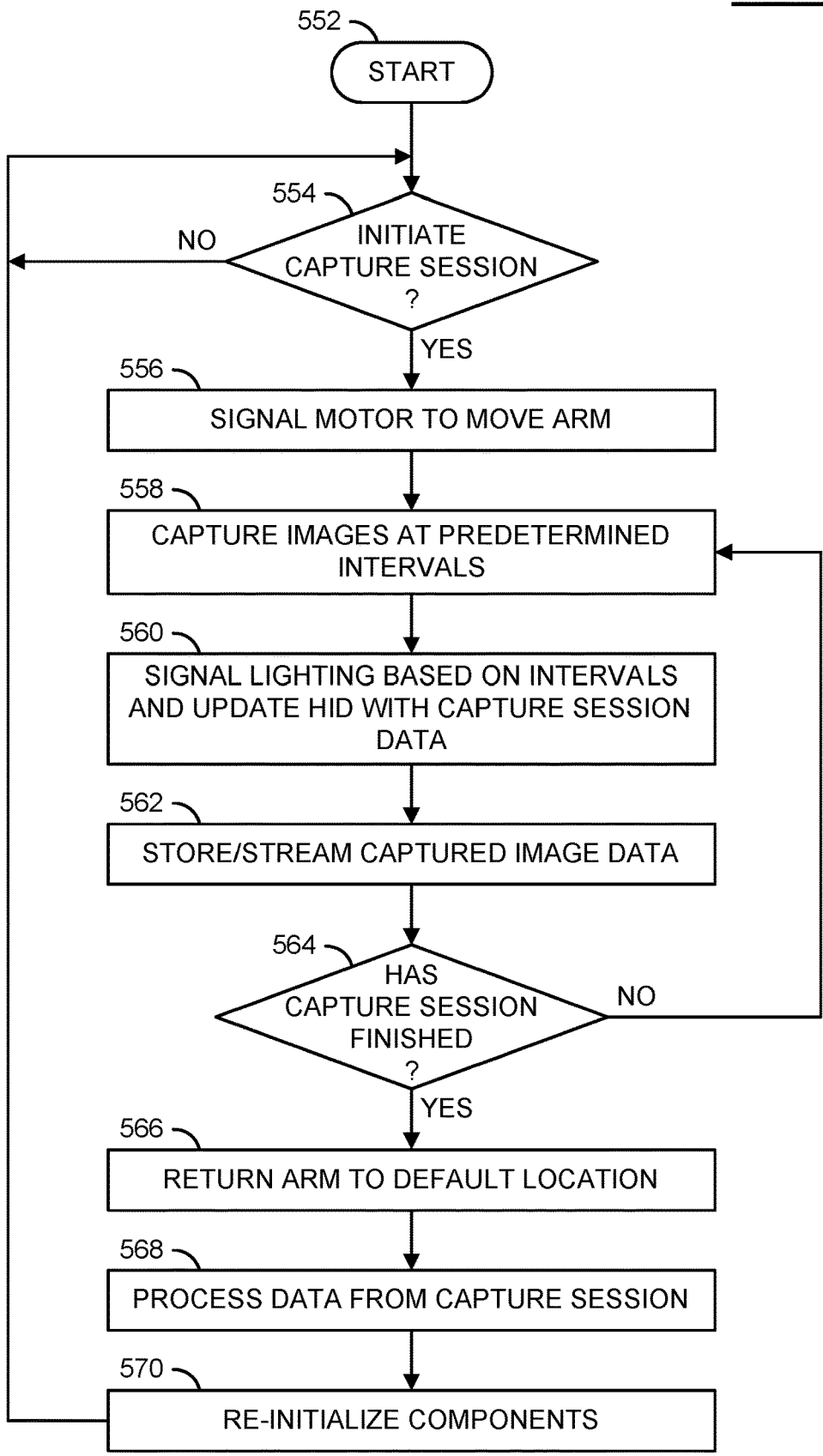
FIG. 19 is a flow diagram illustrating a method for implementing a capture session.

Referring to FIG. 19, a method (or process) 550 is shown. The method 550 may implement a capture session. The method 550 generally comprises a step (or state) 552, a decision step (or state) 554, a step (or state) 556, a step (or state) 558, a step (or state) 560, a step (or state) 562, a decision step (or state) 564, a step (or state) 566, a step (or state) 568, and a step (or state) 570.

The step 552 may start the method 550. Next, in the decision step 554, the controller 120 may determine whether to initiate the capture session. If the capture session is not initiated, the method 550 may return to the decision step 554 (e.g., remain in the idle state with the arm 160 at the home position). If the capture session is initiated, then the method 550 may move to the step 556.

In the step 556, the controller 120 may signal the motor 140 to move the arm 160. For example, the controller 120 may generate the signal MCTRL. Next, in the step 558, the camera 150 may capture images at predefined intervals. For example, the controller 120 may generate the signal CCTRL to trigger the camera 150 according to the capture routine stored in the memory 500. In the step 560, the controller 120 may signal the lights 492 based on intervals and/or update a human interface device (HID such as the user device 50 or an on-site display) with data about the capture session. Next, in the step 562, the controller 120 may store and/or stream the captured image data. In an example, the controller 120 may receive the signal IMG from the camera 150 and stream the captured data (e.g., the signal NETWORK) and/or store the data locally (e.g., to the memory 500). Next, the method 550 may move to the decision step 564.

In the decision step 564, the controller 120 may determine whether the capture session has finished. In an example, the capture session may be finished based on the position of the arm 160 and/or after a timer has elapsed. If the capture session has not finished, then the method 550 may return to the step 558. If the capture session has finished, then the method 550 may move to the step 566.

In the step 566, the controller 120 may instruct the arm 160 to return to the default (e.g., home) location. Next, in the step 568, the controller 120 may process various data from the capture session. In the step 570, the controller 120 may re-initialize various components of the apparatus 100. Next, the method 550 may return to the decision step 554.

When the capture session in initiated, the controller 120 may record the start angle of the arm 160 to the memory 500. The controller 120 may start a timer. The controller 120 may keep track of the number of images captured.

During the capture session, the controller 120 may read an angle of the arm 160 and the camera(s) 150a-150n may be triggered at predetermined angles (or at predetermined time intervals). The controller 120 may signal lighting to change based on the angle (e.g., the current location in the capture session). The image data from the camera(s) 150a-150n may be saved to a data storage device and/or streamed/transferred to another device. The controller 120 may update indicators and a HID with information such as current angle, sensor data, captured images, timer, etc.

The capture session may be finished according to various conditions. In one example, the capture session may be finished when the arm 160 has reached a goal angle and/or the arm has rotated a predetermined number of times. In another example, the capture session may be finished when the controller 120 has triggered the camera(s) 150a-150n a predetermined number of times and/or the controller 120 has received a predetermined number of images. In yet another example, the capture session may be finished after a particular amount of time. In still another example, the capture session may be finished when a stop button has been pressed or a stop signal was sent to controller 120 (e.g., an emergency shutdown).

After the capture session has ended, the controller 120 may continue rotating the arm 160 to reach the goal "resting" angle. The controller 120 may start (or continue) transferring the images from the camera(s) 150a-150n to a data storage device. The controller 120 may transfer/store data from other sensors to a data storage device.

After data has been processed, the apparatus 100 may reset. For the reset, the controller 120 may signal the arm 160 to move to a "resting" or "reset" angle. As needed, the controller 120 may power cycle devices/sensors. In some embodiments, the controller 120 may reset itself. The controller 120 may further update an indicator and/or HID to alert the user that an action may be needed to be performed to resume normal operation.

Figure 20:
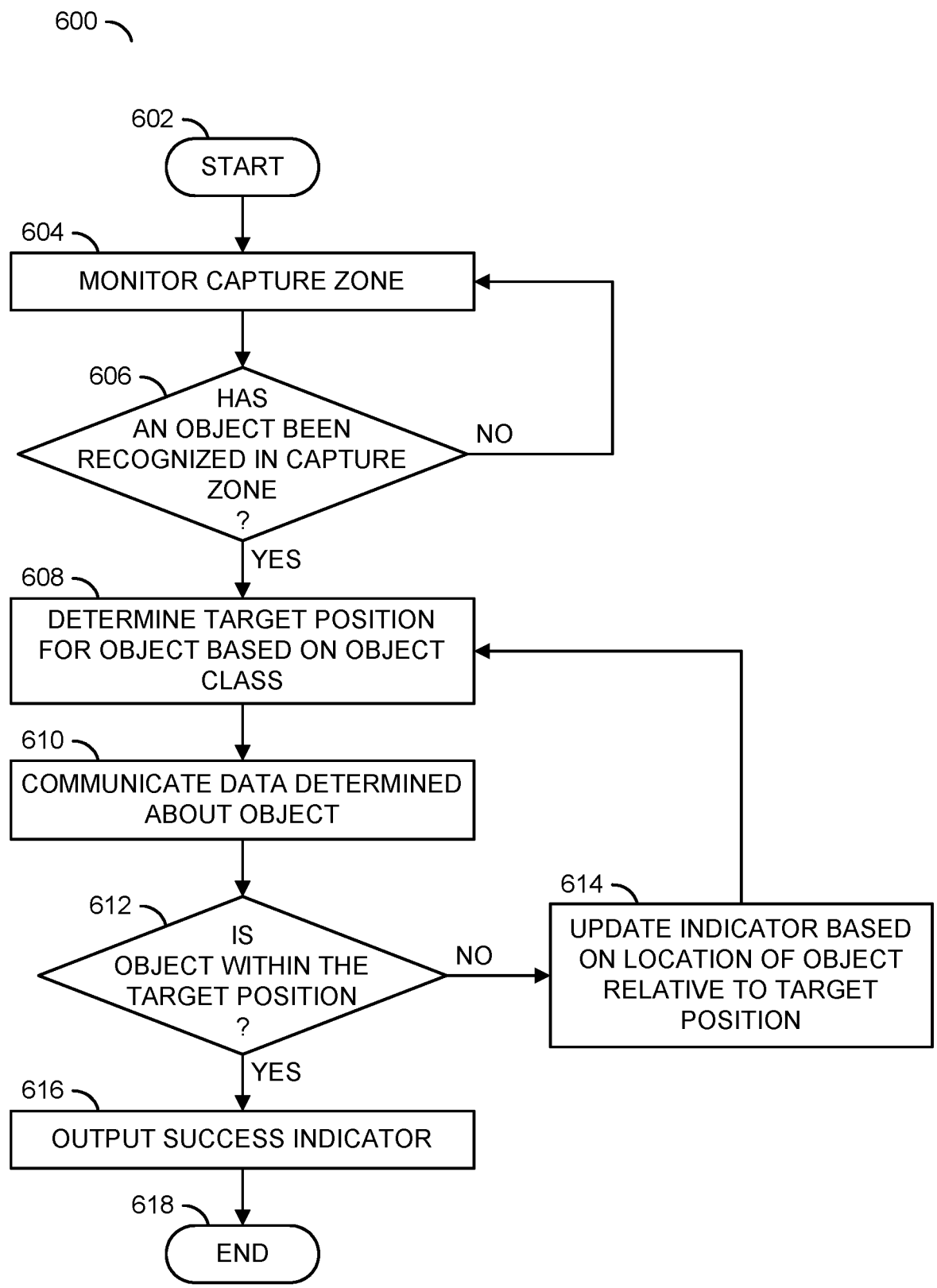
FIG. 20 is a flow diagram illustrating a method for tracking an object during a capture session.

Referring to FIG. 20, a method (or process) 600 is shown. The method 600 may track an object during a capture session. The method 600 generally comprises a step (or state) 602, a step (or state) 604, a decision step (or state) 606, a step (or state) 608, a step (or state) 610, a decision step (or state) 612, a step (or state) 614, a step (or state) 616, and a step (or state) 618.

The step 602 may start the method 600. In the step 604, the controller 120 may monitor the capture zone (e.g., using the images and/or sensor data). Next, the method 600 may move to the decision step 606.

In the decision step 606, the controller 120 may determine whether the object 60 has been recognized in the capture zone. If no object has been recognized, then the method 600 may return to the step 604. If the object 60 has been recognized, then the method 600 may move to the step 608.

In the step 608, the controller 120 may determine a target position for the object 60 (e.g., a location under the housing 104) based on the object class detected. Next, in the step 610, the data determined about the object 60 determined by the tracking system may be used by the controller 120 to determine the capture session. Next, the method 600 may move to the decision step 612.

In the decision step 612, the controller 120 may determine whether the object 60 is within the target position. If the object 60 is not in the target position, then the method 600 may move to the step 614. In the step 614, the controller 120 may update an indicator (e.g., the lights 492) based on the location of the object 60 relative to the target position. Next, the method 600 may return to the step 608.

In the decision step 612, if the object 60 is in the target position, then the method 600 may move to the step 616. In the step 616, the controller 120 may generate an output for a success indicator (e.g., a green light, an alert to the user device 50, etc.). Next, the method 600 may move to the step 618. The step 618 may end the method 600.

The indicator may be a visual and/or an audible indicator. The goal position may be determined based on the attributes detected about the object 60 (e.g., based on images and computer vision, based on a cloud of points, etc.). A success indicator may be presented when the object 60 is within a tolerable range of the goal position.

Figure 21:
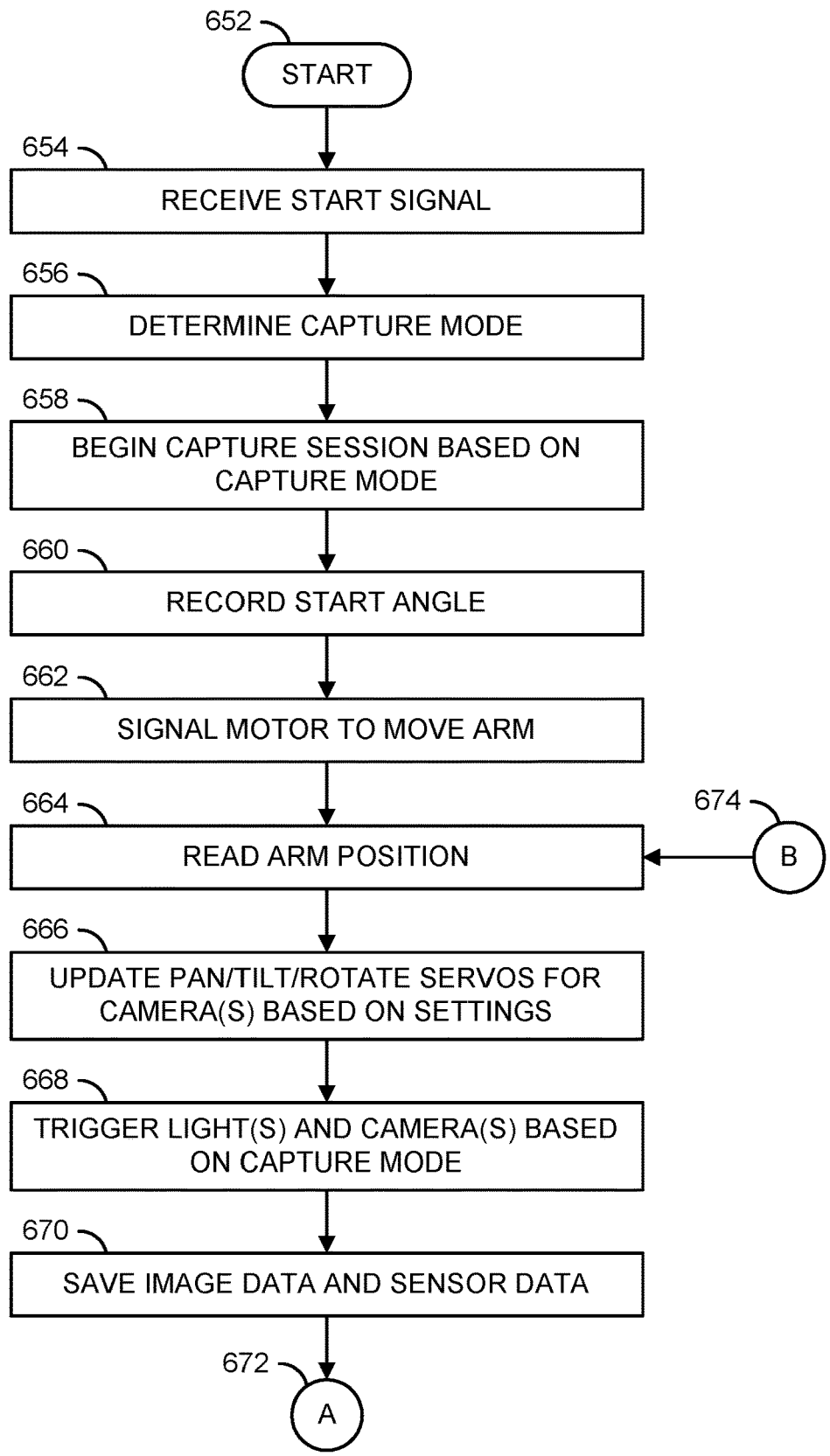
FIG. 21 is a flow diagram illustrating a first portion of a method for capturing images during a capture session.

Referring to FIG. 21, a method (or process) 650 is shown. The method 650 may be a first portion of a method for capturing images during a capture session. The method 650 generally comprises a step (or state) 652, a step (or state) 654, a step (or state) 656, a step (or state) 658, a step (or state) 660, a step (or state) 662, a step (or state) 664, a step (or state) 666, a step (or state) 668, a step (or state) 670, a step (or state) 672, and a step (or state) 674.

The step 652 may start the method 650. In the step 654, the controller 120 may receive a start signal. Next, in the step 656, the controller 120 may determine a capture mode for the capture session. In the step 658, the controller 120 may begin the capture session based on the capture mode. Next, the method 650 may move to the step 660.

In the step 660, the controller 120 may record the start angle of the arm 160. Next, in the step 662, the controller 120 may generate the signal MCTRL to move the arm 160. In the step 664, the controller 120 may read the current position of the arm 160. Next, the method 650 may move to the step 666.

In the step 666, the controller 120 may update the camera motors 480a-480n for the camera 150a-150n based on settings of the capture session (e.g., set the pan/tilt/rotate servos to angle the cameras 150a-150n). Next, in the step 668, the controller 120 may trigger the lights 492 based on the capture mode. In the step 670, the controller 120 may save the image data captured by the cameras 150a-150n and/or the sensor data (e.g., from the lidar 484 and/or the radar 482). Next, the method 650 may move to the step 672.

The capture session may be started in various ways. In one example, a start button may be pressed. In another example, the controller 120 may receive a start signal from a HID. In yet another example, the controller 120 may receive a signal and/or pattern from a sensor that validates as a start signal. In still another example, the tracking system may indicate a successful positioning of the object 60 to start the capture session.

In some embodiments, the apparatus 100 may implement multiple buttons for the various types of capture modes. In another example, the capture mode may be selected in response to user input using an interface such as the user device 50. One example capture mode may trigger the camera(s) 150a-150n 30 times over 30 seconds. Another example capture mode may trigger the cameras(s) 150a-150n 60 times over 30 seconds. The types of camera modes available may be varied according to the design criteria of a particular implementation.

After the arm 160 begins rotating, the controller 120 may track the arm 160 throughout the capture session. In some embodiments, the controller 120 may set a timer for the capture session. In another example, the controller 120 may track the capture session based on the number of images captured.

During the capture session, the controller 120 may read the angle of the arm 160 and/or save the location/angle to the memory 500. The controller 120 may update the camera motors 480a-480n based on predetermined settings or settings based on sensor data, or arm angle, or a timer. Similarly, the cameras 150a-150n may be triggered and/or the lights 492 may be changed based on predetermined settings or settings based on sensor data, or arm angle, or a timer.

Image data received from the camera(s) 150a-150n may be saved to a data storage device and/or streamed/transferred to another device (controller). The sensor data from sensors mounted on the arm 160 (or elsewhere) may be processed in real-time by the controller 120 and may be recorded to the memory 500 for later analysis. For example, data from the lidar 484 may be saved in reference to the session timer and/or arm angle for processing.

Figure 22:
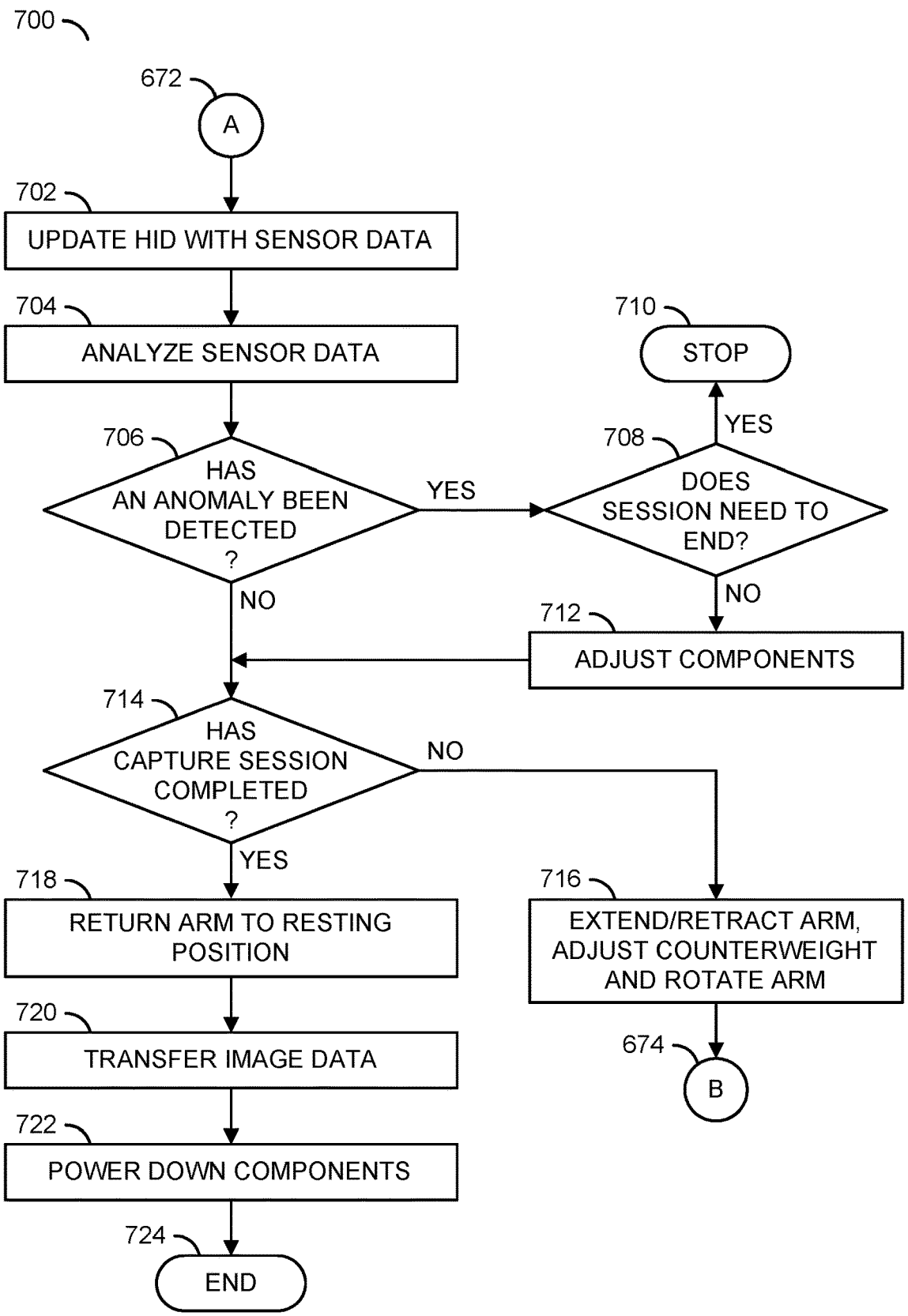
FIG. 22 is a flow diagram illustrating a second portion of a method for capturing images during a capture session.

Referring to FIG. 22, a method (or process) 700 is shown. The method 700 may be a second portion of a method for capturing images during a capture session. The method 700 generally comprises a step (or state) 702, a step (or state) 704, a decision step (or state) 706, a decision step (or state) 708, a step (or state) 710, a step (or state) 712, a decision step (or state) 714, a step (or state) 716, a step (or state) 718, a step (or state) 720, a step (or state) 722, and a step (or state) 724.

From the state 672 of the method 650, the method 700 may move to the step 702. In the step 702, the controller 120 may update the HID with the sensor data. Next, in the step 704, the controller 120 may analyze the sensor data. Next, the method 700 may move to the decision step 706.

In the decision step 706, the controller 120 may determine whether an anomaly has been detected. If an anomaly has been detected, then the method 700 may move to the decision step 708. In the decision step 708, the controller 120 may determine whether the capture session needs to end. For example, the capture session may need to end as a result of a collision and/or an emergency shutdown by the operator. If the capture session does not need to end, then the method 700 may move to the step 710. In the step 710, the capture session may stop. In the decision step 708, if the capture session does not need to end, then the method 700 may move to the step 712. In the step 712, the components of the apparatus 100 may be adjusted. Next, the method 700 may move to the decision step 714.

In the decision step 706, if an anomaly has not been detected, then the method 700 may move to the decision step 714. In the decision step 714, the controller 120 may determine whether the capture session has completed. If the capture session has not completed, then the method 700 may move to the step 716. In the step 716, the controller 120 may generate the signal MCTRL to extend/retract the arm 160, adjust the counterweight 180 and/or rotate the arm 160. Next, the method 700 may move to the step 674. The step 674 may return to the step 664 of the method 650 (e.g., read the position of the arm 160).

In the decision step 714, if the capture session has completed, then the method 700 may move to the step 718. In the step 718, the controller 120 may return the arm 160 to the resting position. Next, in the step 720, the controller 120 may transfer the image data. In the step 722, the controller 120 may power down one or more components of the apparatus 100. Next, the method 700 may move to the step 724. The step 724 may end the method 700.

The controller 120 may update indicators and/or a HID with information such as an angle of the arm 160, angles of the cameras 150a-150n, sensor data, captured images, etc. The controller 120 may analyze sensor and/or image data in real-time to recognize anomalies and adjust connected devices in real-time or end the capture session early. For example, the tracking system may recognize when a human, animal and/or other object has entered the capture zone. In another example, the controller 120 may end the session early and stop the arm 160 to prevent a collision.

The arm 160 may be configured in a way that allows for the arm assembly to extend and retract in addition to rotation. The arm 160 may extend and retract based on predetermined settings or settings based on sensor data, or arm angle, or a timer. The controller 120 may determine how far to extend and retract the arm at specific angles based on data captured and processed from sensors mounted on the arm 160 or elsewhere. Adjustments to the arm 160 may be determined in real-time as the arm 160 is rotating around the object 60 (e.g., pathfinding may be implemented and the results in settings and motor instructions determined by the controller 120 to move the arm 160 to a specific position in 2D or 3D space without colliding with the object 60 or other objects or humans in the capture zone). The counterweight 180 may be mechanically moved along the arm 160 based on the position of the extending/retracting components and/or the angle of the arm 160 to optimize the force applied (e.g., maintain balance for the arm 160).

The controller 120 may determine when the capture session is finished. The capture session may be finished when the arm 160 has reached a goal angle, the arm 160 has rotated a predetermined number of times, the controller 120 triggered the camera(s) 150a-150n a predetermined number of times, the controller 120 saved a predetermined number of images to a storage device, the timer implemented by the controller 120 has been running for a predetermined amount of time, a signal or pattern from a sensor validates as a stop signal, a stop button was pressed or a stop signal was sent to the controller 120, etc.

After the controller 120 ends the capture session, the controller 120 may continue rotating the arm 160 to reach a goal "resting" angle. The controller 120 may start/continue transferring the images from the camera(s) 150a-150n to a data storage device. The controller 120 may signal the camera(s) 150a-150n (or other sensors or devices) to enter a "sleep" or "low power" mode of operation (e.g., to conserve power). The lights 492 may be set to a predetermined state. The controller 120 may transfer/store data from other sensors to a data storage device.

Figure 23:
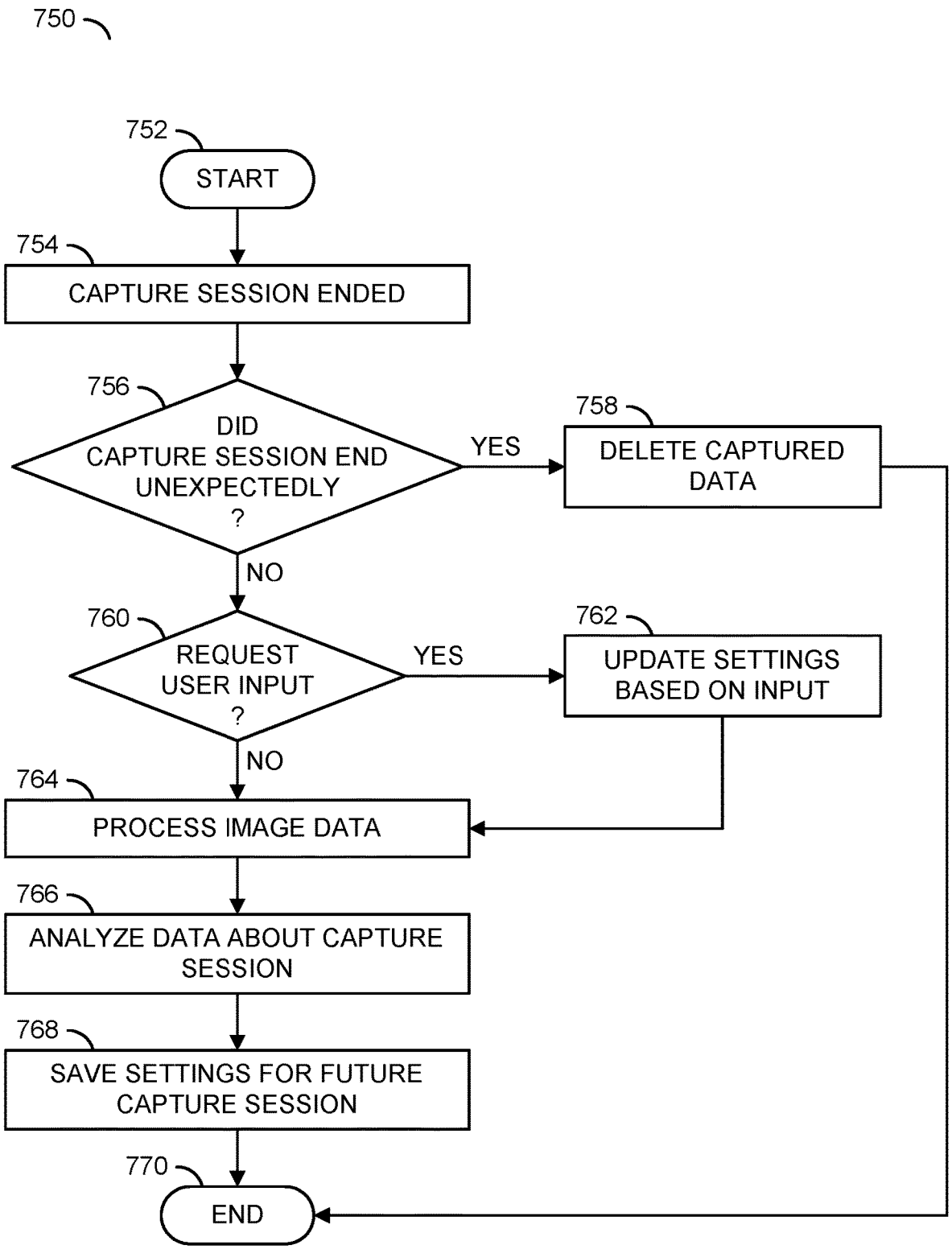
FIG. 23 is a flow diagram illustrating a method for processing data.

Referring to FIG. 23, a method (or process) 750 is shown. The method 750 may process data. The method 750 generally comprises a step (or state) 752, a step (or state) 754, a decision step (or state) 756, a step (or state) 758, a decision step (or state) 760, a step (or state) 762, a step (or state) 764, a step (or state) 766, a step (or state) 768, and a step (or state) 770.

The step 752 may start the method 750. In the step 754, the capture session may have ended. Next, the method 750 may move to the decision step 756.

In the decision step 756, the controller 120 may determine whether the session ended unexpectedly (e.g., the arm 160 collided with an obstacle, the operator ended the capture session early, etc.). If the session ended unexpectedly, then the method 750 may move to the step 758. In the step 758, the controller 120 may delete the captured data. Next, the method 750 may move to the step 770. In the decision step 756, if the capture session did not end unexpectedly, then the method 750 may move to the decision step 760.

In the decision step 760, the controller 120 may determine whether to request user input. If user input is requested, then the method 750 may move to the step 762. In the step 762, the controller 120 may update settings based on the user input. Next, the method 750 may move to the step 764. In the decision step 760, if user input is not requested, then the method 750 may move to the step 764.

In the step 764, the controller 120 may process the captured image data (and video data and sensor data, etc.). Next, in the step 766, the controller 120 may analyze the data about the capture session (e.g., timings, whether satisfactory images were captured, feedback from the operator, etc.). In the step 768, the controller 120 may save settings for a future capture session. The settings saved may comprise improvements determined for the capture session based on the analysis of the data about the capture session. Next, the method 750 may move to the step 770. The step 770 may end the method 750.

The controller 120 may skip data processing and/or delete all data if the capture session was stopped early (e.g., canceled by the user). The controller 120 may process image data with predetermined settings or settings based on results from the image analysis. The controller 120 may prompt the user for additional settings, processing, and/or approval as the request for user input. The controller 120 may save the resulting data to a data storage device and/or transmit the data to a remote server or other controller.

The functions performed by the diagrams of FIGS. 1-23 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a housing connected to a ceiling of a room;
   an arm having (i) a pivot portion connected to said housing, and (ii) a portion extending from said pivot portion in a first direction;
   a motor connected to said pivot portion of said arm to move said arm in response to a control signal;
   a camera mount connected to an end of said portion of said arm;
   stereo depth cameras configured to (i) determine a location of an object under said arm and (ii) generate a warning signal if said location of said object is not centered in a capture volume of a camera mounted to said camera mount; and
   a controller configured to (i) receive input from a user, (ii) generate said control signal and (iii) generate a camera signal, wherein
   (a) said input comprises instructions for capturing a predetermined number of still images based on an amount of rotation traveled by said arm, (b) said controller is configured to determine a timing for said camera signal to enable a capture of said predetermined number of still images for said amount of rotation traveled by said arm, and (c) said controller generates said camera signal based on said timing while providing said control signal to rotate said arm for said amount of rotation.

2. The apparatus according to claim 1, wherein said motor moves said arm in fixed movements.

3. The apparatus according to claim 1, wherein (i) a camera is mounted to said camera mount and (ii) said camera is pointed toward said pivot portion.

4. The apparatus according to claim 3, wherein said camera is connected to said controller using at least one of a wireless connection or a wired connection.

5. The apparatus according to claim 1, wherein said controller is a microcontroller or a video processor.

6. The apparatus according to claim 3, wherein said camera is configured to capture said predetermined number of said still images of an object located under said arm.

7. The apparatus according to claim 6, wherein said predetermined number of said still images are spaced about an object based on said timing.

8. The apparatus according to claim 7, wherein said apparatus captures said predetermined number of still images after a single initialization without further user intervention.

9. An apparatus comprising:

a housing connected to a ceiling of a room;

an arm having (i) a first portion having a linear shape and connected to said housing with a bearing and (ii) a second portion having a curved shape and extending from said first portion, wherein said first portion is configured to slide within said bearing to vary a distance of an end of said second portion with respect to a target point;

a motor connected to said first portion of said arm to control movement of said arm in response to a control signal; and a camera mount connected to an end of said second portion of said arm, wherein (i) said extending of said first portion creates an irregularly shaped path about an object and (ii) said irregularly shaped path comprises a rotation of said arm around said object while said extending of said first portion varies said distance.

10. The apparatus according to claim 9, wherein said camera mount is configured to twist along a vertical axis as said camera mount moves about said irregularly shaped path.

11. The apparatus according to claim 9, wherein said irregularly shaped path comprises an oval.

12. The apparatus according to claim 9, wherein said motor moves said arm in fixed movements.

13. The apparatus according to claim 9, wherein (i) a camera is mounted to said camera mount and (ii) said camera is pointed toward a pivot portion.

14. The apparatus according to claim 13, wherein said camera is connected to a controller using at least one of a wireless connection or a wired connection.

15. The apparatus according to claim 13, wherein said camera is configured to capture a plurality of images of said object that are spaced about said object.

16. The apparatus according to claim 9, wherein said apparatus further comprises a second motor configured to control extending said first portion in response to a second control signal.

17. A method for capturing consistent still images of an object, comprising the steps of:

connecting a camera to a camera mount attached to an arm, wherein said arm is configured to be rotated by a motor in response to a control signal;

determining a location of an object under said arm using stereo depth cameras;

generating a warning signal if said location of said object is not centered in a capture volume of said camera mounted to said camera mount;

initiating a capture session if said location of said object is centered in said capture volume of said camera mounted to said camera mount, wherein (i) said capture session comprises computer readable instructions executable by a controller, (ii) said controller receives input from a user comprising instructions for capturing a predetermined number of said still images based on an amount of rotation traveled by said arm, (iii) said controller is configured to determine a timing for a camera signal to enable a capture of said predetermined number of said still images for said amount of rotation traveled by said arm and (iv) said controller is configured to generate said control signal and said camera signal;

rotating said arm around said object in response to said capture session;

triggering said camera at predefined intervals to capture said predetermined number of said still images of said object while said arm is rotating, wherein said controller generates said camera signal based on said timing while providing said control signal to rotate said arm for said amount of rotation;

storing said predetermined number of said still images to a memory;

returning said arm to a default location when said capture session has completed; and processing said predetermined number of said still images captured during said capture session to output a stream of said still images that provides a consistent view of said object for said capture session.

18. The apparatus according to claim 9, further comprising stereo depth cameras, wherein (i) said stereo depth cameras are configured to determine a location of said object under said arm and (ii) generate a warning signal if said location of said object is not centered in a capture volume of a camera mounted to said camera mount.

19. The apparatus according to claim 9, further comprising:

a camera connected to said camera mount configured to capture a plurality of images in response to a camera signal; and a controller configured to (i) generate said camera signal, (ii) receive a plurality of images captured by said camera, (iii) analyze said plurality of images, (iv) detect characteristics of said object and (v) adjust said control signal to enable said arm to alter said irregularly shaped path to enable said camera to capture a zoomed in picture of said characteristics detected.

20. The apparatus according to claim 1, wherein said amount of rotation traveled by said arm comprises a 360 degree rotation.

* * * * *